(12) United States Patent  (10) Patent No.: US 8,589,805 B2
Knight  (45) Date of Patent: Nov. 19, 2013

(54) CUSTOMIZABLE CONSTITUENT COMMUNICATION METHOD, SYSTEM, AND COMPUTER READABLE MEDIUM

(76) Inventor: Brian Knight, Austin, TX (US)

(*) Notice: Subject to any disclaimer, the term of this patent is extended or adjusted under 35 U.S.C. 154(b) by 371 days.

(21) Appl. No.: 13/182,131

(22) Filed: Jul. 13, 2011

(65) Prior Publication Data

US 2012/0278733 A1 Nov. 1, 2012

Related U.S. Application Data

(60) Provisional application No. 61/479,965, filed on Apr. 28, 2011.

(51) Int. Cl.
*G06F 3/00* (2006.01)
*G06F 3/01* (2006.01)

(52) U.S. Cl.
USPC ............ 715/752; 715/747; 715/751; 715/760

(58) Field of Classification Search
USPC .................................. 715/747, 751, 752, 760
See application file for complete search history.

(56) References Cited

U.S. PATENT DOCUMENTS

| 7,426,496 B2* | 9/2008 | Kristjansson | 706/10 |
| 7,502,997 B2* | 3/2009 | Reid et al. | 715/243 |
| 7,668,918 B2* | 2/2010 | Diddee et al. | 709/206 |
| 7,805,489 B2 | 9/2010 | Roberts | |
| 7,913,234 B2 | 3/2011 | Neil et al. | |
| 2002/0174144 A1* | 11/2002 | Wolpe | 707/512 |
| 2005/0198563 A1 | 9/2005 | Kristjansson | |
| 2006/0031772 A1* | 2/2006 | Valeski | 715/751 |
| 2008/0141106 A1* | 6/2008 | Wolpe | 715/200 |
| 2009/0119167 A1* | 5/2009 | Kendall et al. | 705/14 |
| 2011/0029617 A1 | 2/2011 | Hsiao et al. | |
| 2011/0045806 A1 | 2/2011 | Gupta et al. | |
| 2011/0061008 A1 | 3/2011 | Gupta et al. | |
| 2011/0066685 A1 | 3/2011 | Kitada et al. | |
| 2012/0011449 A1* | 1/2012 | Sasson et al. | 715/752 |

OTHER PUBLICATIONS

BrightText: About BrightText, obtained from www.brighttext.com/aboutbt.asp on Mar. 16, 2012.
BrightText, obtained from www.brighttext.com/index.asp on Mar. 16, 2012.

* cited by examiner

*Primary Examiner* — Nicholas Augustine
(74) *Attorney, Agent, or Firm* — Hulsey, P.C.; William N. Hulsey; Loren T. Smith

(57) ABSTRACT

Systems and methods are described that facilitate users communicating information. The disclosed subject matter enables users to disseminate information to others, allows the recipients to incorporate significant amounts of custom information with minimal input, and send this personalized information to additional recipients easily via a mobile device. The disclosed subject matter also enables Organizations to target their members more accurately and easily engage in meaningful dialog.

20 Claims, 32 Drawing Sheets

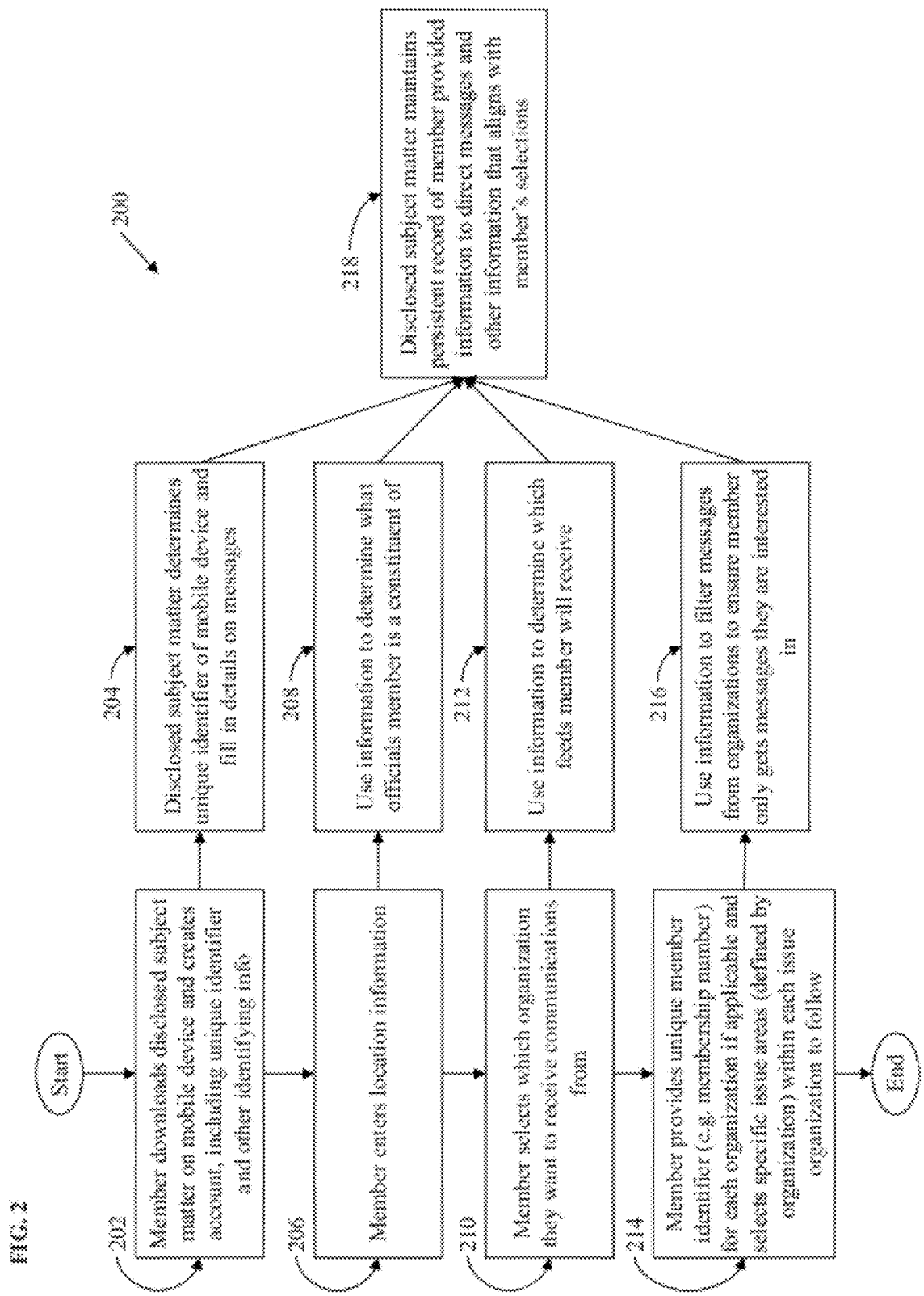

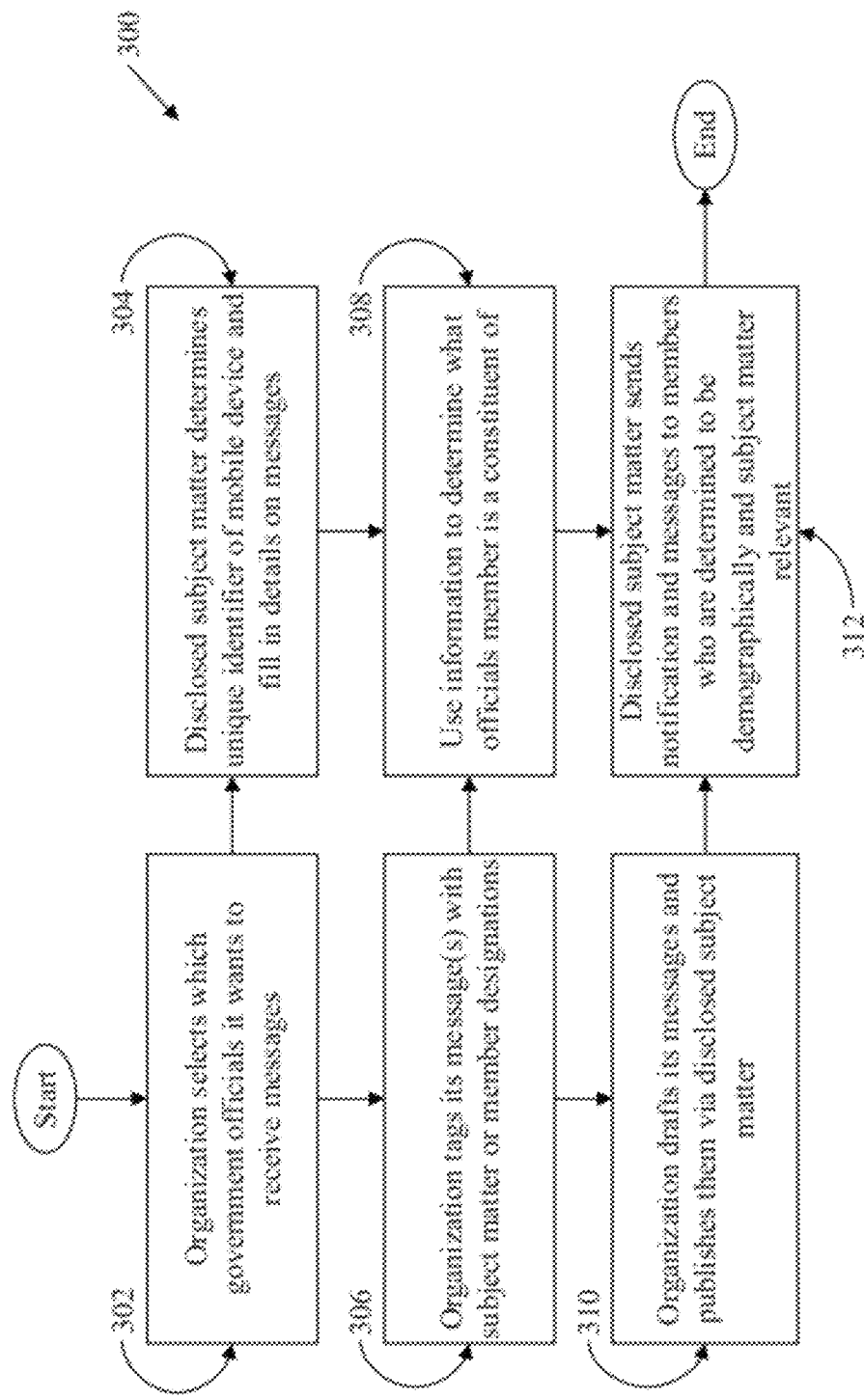

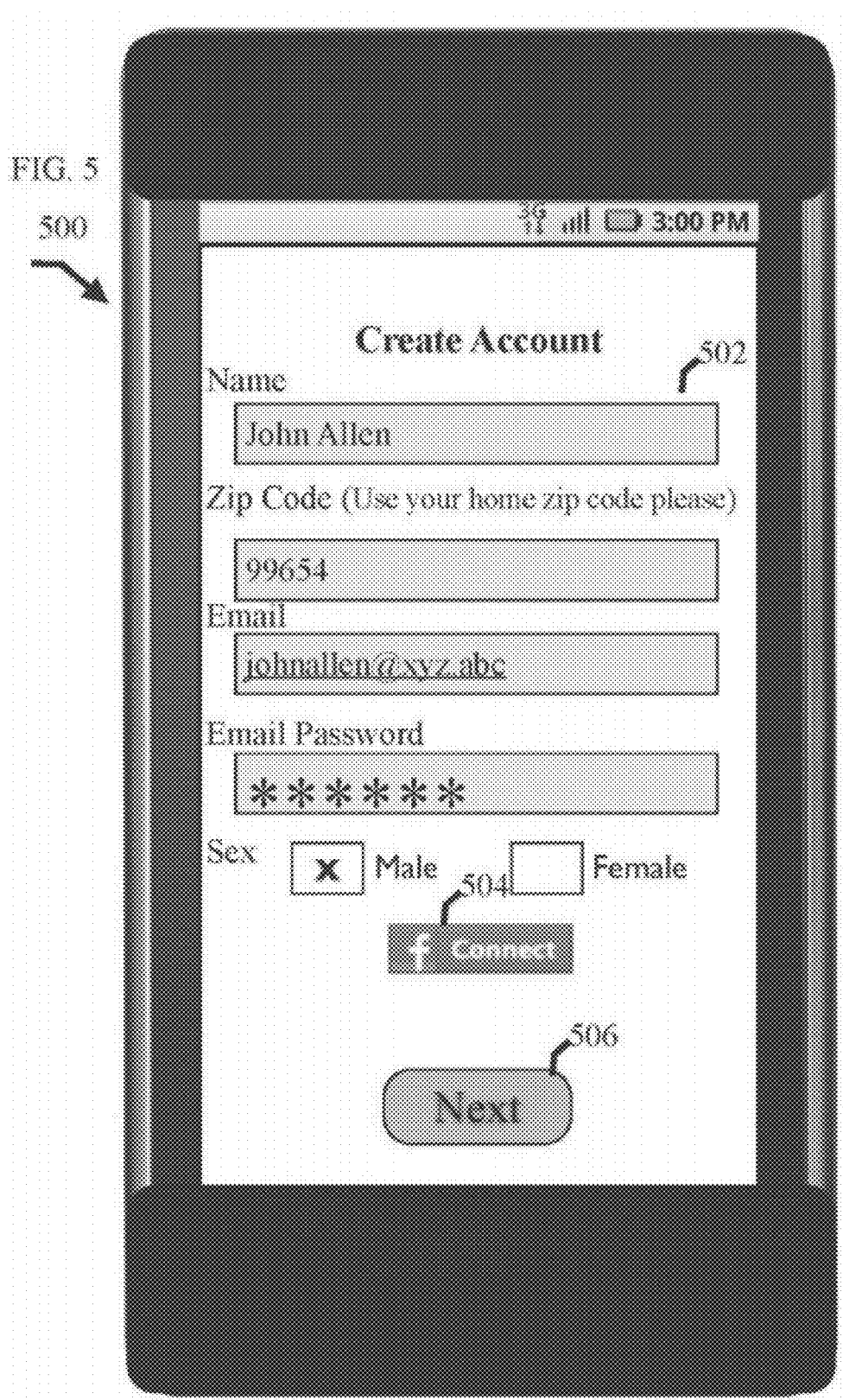

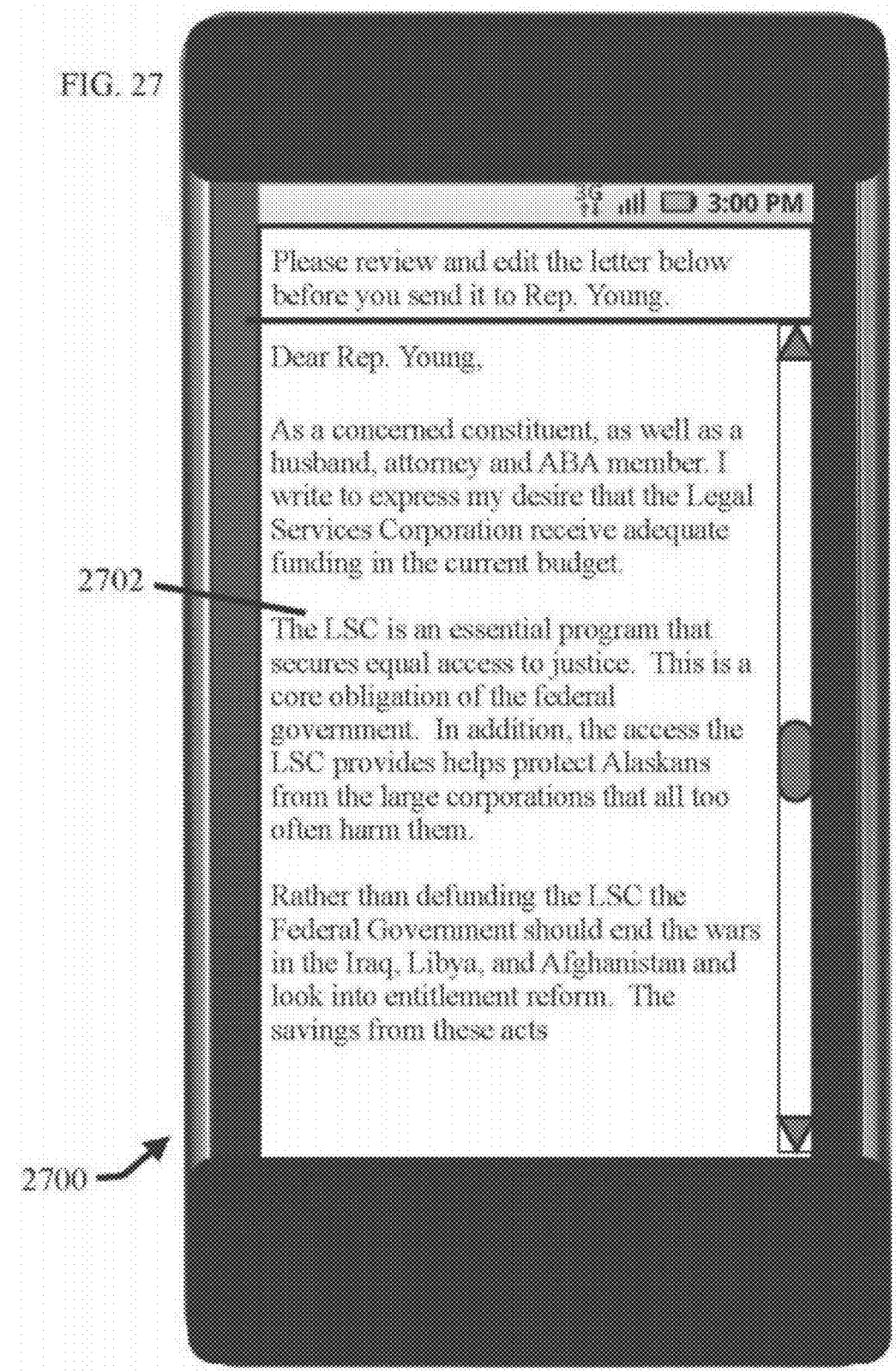

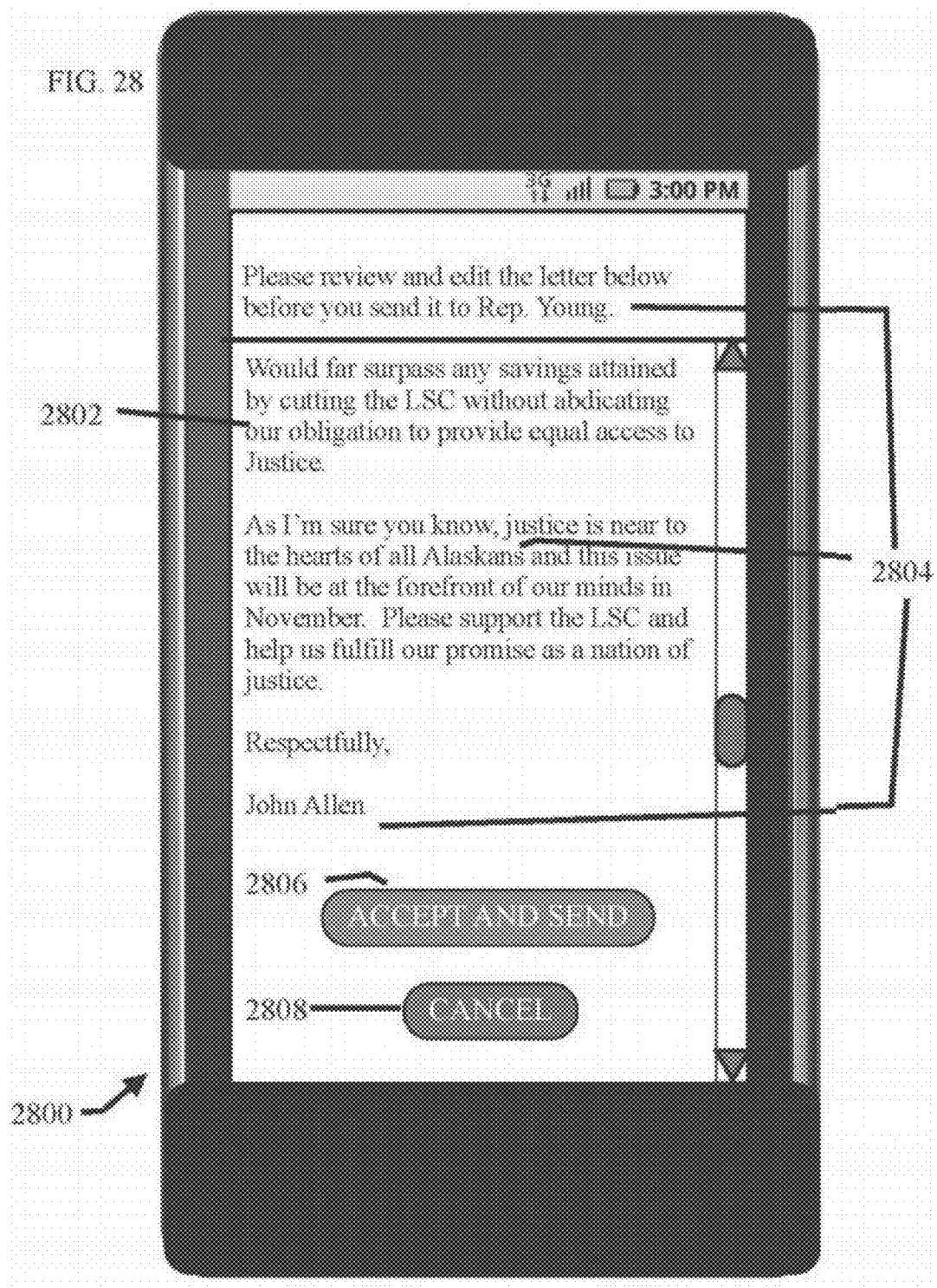

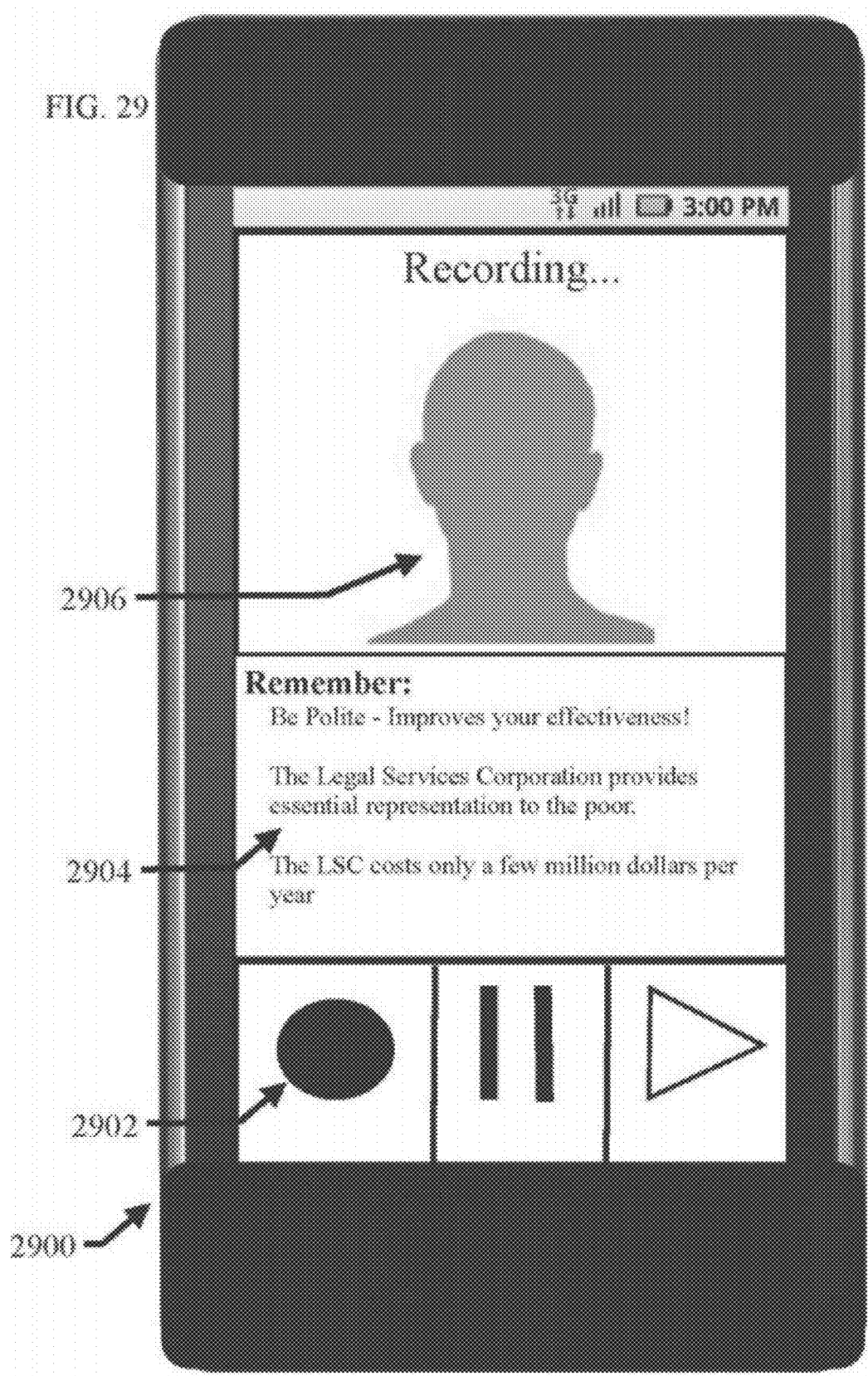

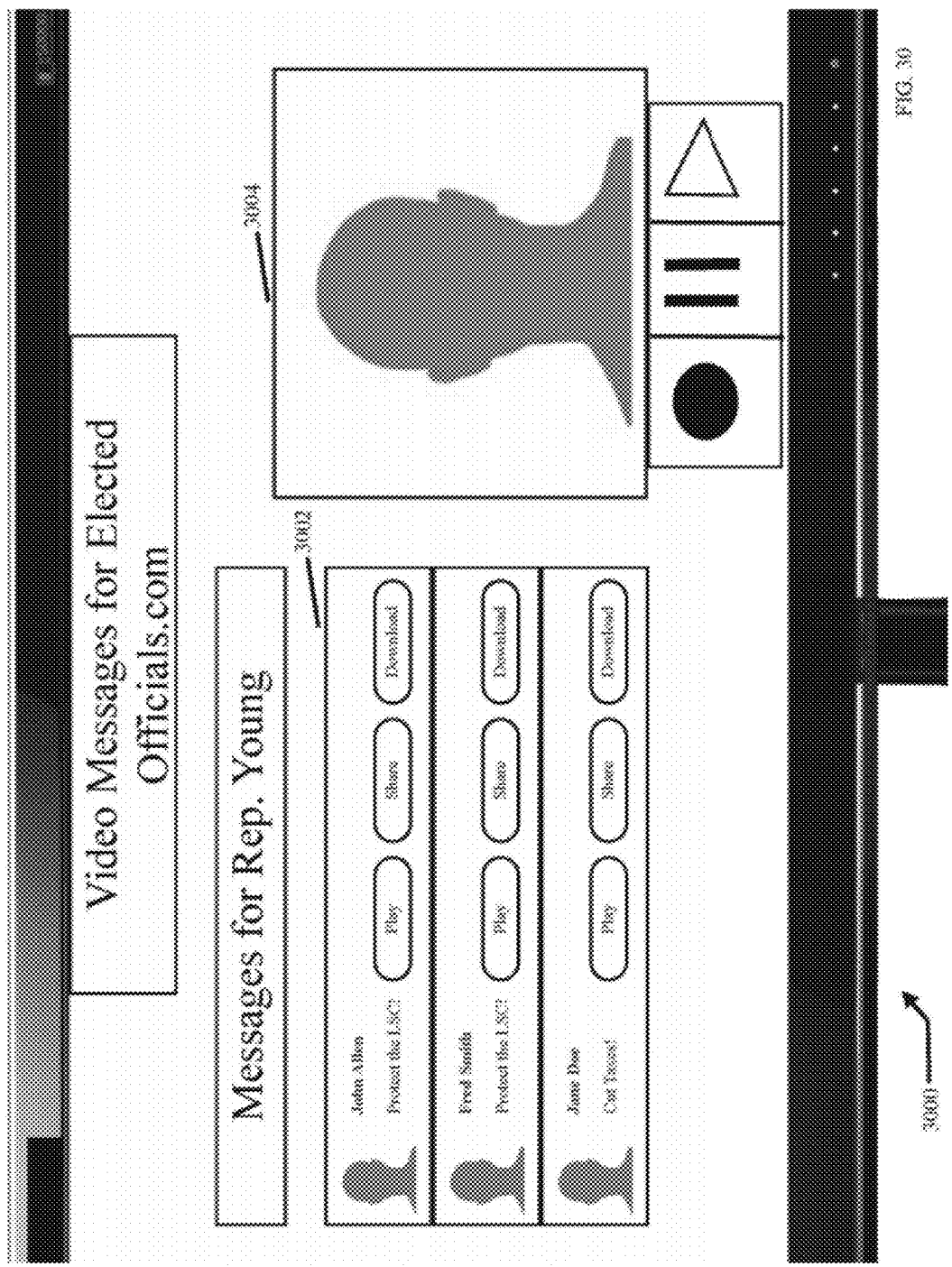

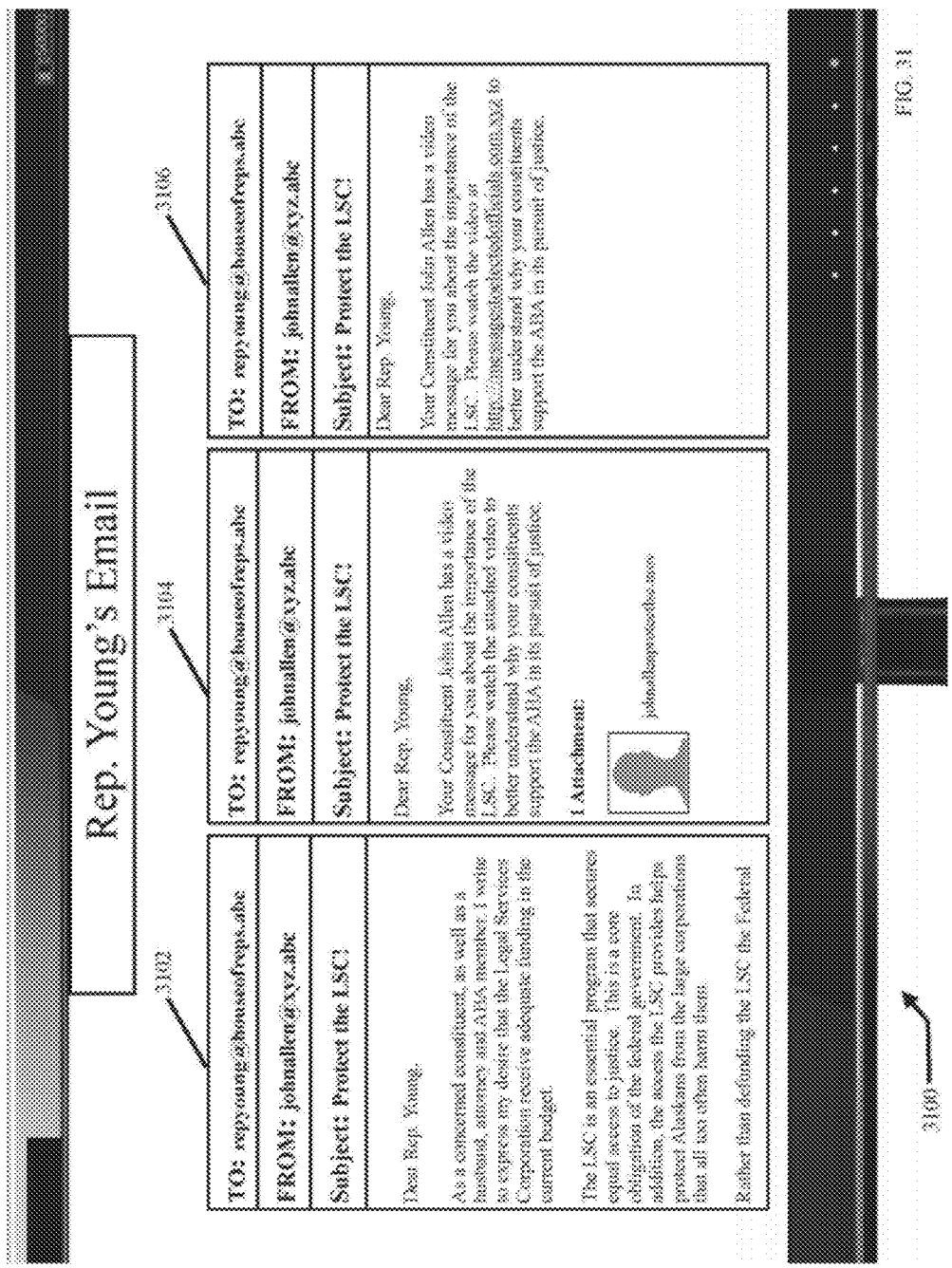

CUSTOMIZABLE CONSTITUENT COMMUNICATION METHOD, SYSTEM, AND COMPUTER READABLE MEDIUM

RELATED APPLICATION

This application claims priority to U.S. Provisional No. 61/479,965, entitled "CUSTOMIZABLE CONSTITUENT COMMUNICATION METHOD, SYSTEM, AND COMPUTER READABLE MEDIUM" and filed on Apr. 28, 2011.

FIELD OF THE INVENTION

This disclosure relates generally to mobile device communications and more specifically to communication between constituent groups and officials via mobile devices.

BACKGROUND

As part of the American political system, advocacy organizations (e.g., the American Civil Liberties Union or the National Rifle Association), corporations, trade groups, unions, and other organizations ("Organizations") try to influence the government to adopt certain policy positions. As part of this effort these Organizations often ask individual citizens who are members of, or sympathetic to, their Organization ("members") to contact government Officials at the national, state, and local level, as well as their employees, agents, and advisors, ("Officials") to express their support or opposition to a particular policy. These messages ("messages") include but are not limited to emails, physical mail, video or audio recordings, and phone calls. Currently these Organizations often rely on emails to members to get those members to send messages to Officials, especially asking members to visit the Organization's website and fill out a web form that identifies the government Official of which the member is a constituent and provides the member with a draft email to send to their Official.

This system is flawed because it fails to consider that emails to members asking them to contact their Officials are often inconvenient for the member to act on, particularly if they are not near a personal computer they can use for that purpose. Under the current system, members often need to enter their personal information repeatedly, and have to navigate cumbersome web pages. The current system is also inapt to the current reality of widespread mobile device use, where members often access their emails via mobile devices that are ill suited to the non-mobile optimized web pages used by Organizations. The current system also fails to leverage other communication tools, including but not limited to social media (e.g., Facebook® (a registered trademark of Facebook, Inc.), Twitter® (a registered trademark of Twitter, Inc.), etc.) email, and other political media to allow members to alert their acquaintances of their political activity. In addition, the current system denies the member of an Organization a meaningful way to reject the Organization's request for action and provide constructive feedback to the Organization as to why the member declined to act or to seek additional information from the Organization before deciding whether to accept or reject a request.

Likewise, the current system is flawed from the Organizations' perspective because the Organizations are limited in the diversity of messages that they can put before their members to be sent to Officials, leading Officials to dismiss the large number of near identical messages as "astroturf." Additionally, the current system denies Organizations a convenient way to determine which of their positions are popular or unpopular with their membership. The current system also fails to allow Organizations to target their members with real precision, either based on subject matter or relevant geography, resulting in many members getting emails asking them to act when their Officials, and therefore the members' action, are not relevant. This leads to desensitization on the part of members to Organizations' requests for action.

In view of the above shortcomings, there is a need for a new method of connecting Organizations to members and members to Officials.

BRIEF DESCRIPTION OF THE DISCLOSED SUBJECT MATTER

The disclosed subject matter solves these and other flaws.

It is a technical advantage of the disclosed subject matter to provide near instantaneous ability to act on message requests. Members can send either prepared or custom messages from their mobile devices with just a few inputs, allowing members to react instantly to Organizations' requests, regardless of location.

It is a technical advantage of the disclosed subject matter to provide near instantaneous feedback from members to Organizations. Members are able to provide Organizations with instant feedback on the Organizations' messages from mobile devices, either by rejecting the message and providing reasons for the rejection or accepting either a prepared or custom message, providing the Organization with data on what part or variant of their proposed message was agreeable to the member.

It is a technical advantage of the disclosed subject matter to provide the ability to create custom messages from a mobile device with minimal input. Members will be able to create messages that reflect their personal beliefs without having to type everything out through the use of pre-populated choices. While the user will maintain the ability to customize the message fully, the use of the pre-populated choices will allow him or her to create a unique message with just a few inputs.

It is a technical advantage of the disclosed subject matter that members will be able to create unique messages, including photographic, audio, and video messages, with the assistance of prompts and information provided by the organization, and using the mobile device's technical capabilities (including but not limited to a camera, video recorder, or microphone) that can be sent directly to Officials or sent to other venues for forwarding to Officials or consumption by the public.

It is a technical advantage of the disclosed subject matter to provide the ability to request specific relevant information instantly. Members will be able to request information on a specific topic before deciding whether to act on an Organization's message.

It is a technical advantage of the disclosed subject matter to provide the ability for members to instantly inform their acquaintances of their political action. Members will be able to generate messages via multiple platforms, such as social networks and email, to inform people they know about issues and provide easy access to information or action.

It is a technical advantage of the disclosed subject matter to provide Organizations with actionable analytics regarding member opinions. Organizations will be able to analyze the data generated by members selecting to send prepared messages, selecting options from prepopulated choices, whether in generating a message or rejecting a message, and selecting the option to provide written feedback from members delivered via the disclosed subject matter.

It is a technical advantage of the disclosed subject matter to provide Organizations with the ability to precisely target only members who are interested in the relevant subject matter and/or constituents of the relevant Officials. The disclosed subject matter will persistently link members to their Officials and areas of interest, so Organizations can be certain they are only asking members who can and will influence target Officials to act, eliminating false alarms and the need for members to input their information repeatedly.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the appended claims and any claims filed later.

BRIEF DESCRIPTION OF THE DRAWINGS

The novel features believed characteristic of the disclosed subject matter will be set forth in any claims filed later. The disclosed subject matter itself, however, as well as a preferred mode of use, further objectives, and advantages thereof, will best be understood by reference to the following detailed description of illustrative embodiments when read in conjunction with the accompanying drawings, wherein:

FIG. 2 is a flow diagram 200 detailing what information a member creating an account with a particular embodiment of the disclosed subject matter will provide to the disclosed subject matter and how that information will be used by the disclosed subject matter to enable the member's utilization of the disclosed subject matter.

FIG. 3 is a flow diagram 300 detailing how the disclosed subject matter will determine which members should receive the Organization's request for action based on the Organization's inputs.

FIG. 5 is an illustration of a particular embodiment of a form filling interface system 500 the member will use to create an account with the disclosed subject matter.

FIG. 27 is an illustration of a particular embodiment of an interface 2700 that will allow the member to review and edit a message generated in response to the answers the member provided to Organization generated questions (See FIG. 24) that has certain personal information held by the disclosed subject matter automatically and text drafted by the member (see FIG. 26) inserted.

FIG. 28 is an illustration of a particular embodiment of an interface 2800 that will allow the member to review and edit a message generated in response to the answers the member provided to Organization generated questions (See FIG. 24).

FIG. 29 is an illustration of a particular embodiment of an interface 2900 that will allow members to record messages based on prompts provided by the Organization and presented via the disclosed subject matter, including but not limited to video, audio, and photographic messages, using their mobile device's capacity to record such inputs.

FIG. 30 is an illustration of a particular embodiment of a third party venue 3000 for messages created for Officials by members via the disclosed subject matter and routed to the venue by the disclosed subject matter that can be viewed by officials and others.

FIG. 31 is an illustration of certain types of communications created by the disclosed subject matter and provided to the Official.

DETAILED DESCRIPTION OF ILLUSTRATIVE EMBODIMENTS

Although described with particular reference to certain industries and/or equipment, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

The term "input" is defined as including, but not being limited to, one or more of: inputting information via a computer or mobile device, on-screen keyboard, attached keyboard or other input device, wireless keyboard or other input device, stylus, voice commands, video recording or photography, audio recording or tactile commands (including but not limited to shaking or twisting of the phone). The term "mobile device" is defined as including, but not being limited to, on or more of: smart-phones (e.g. iPhone® (a registered trademark of Apple, Inc.), Android™ (a trademark of Google, Inc.) based phones, Blackberry™ (a trademark of Research in Motion Limited) phones, etc.), tablet devices (e.g., iPod Touch® (a registered trademark of Apple, Inc.), iPad® (a registered trademark of Apple, Inc.), Android™ based devices, Blackberry™ based devices, etc.), a personal data assistant, or a mobile personal computer. The term "message" is defined to include any transfer of information intended to be read and/or understood by a human being, including but not limited to, one or more of: emails, phone calls, written questions, videos, audio tracks, pictures, surveys, text messages, and other written communications. The term "prompt" is defined to include any information intended to be read/understood by a human being to provide them with information to be used, either directly or indirectly, in the creation of a message, including but not limited to facts, talking points, or advice on how to effectively convey a message.

Figure 1:
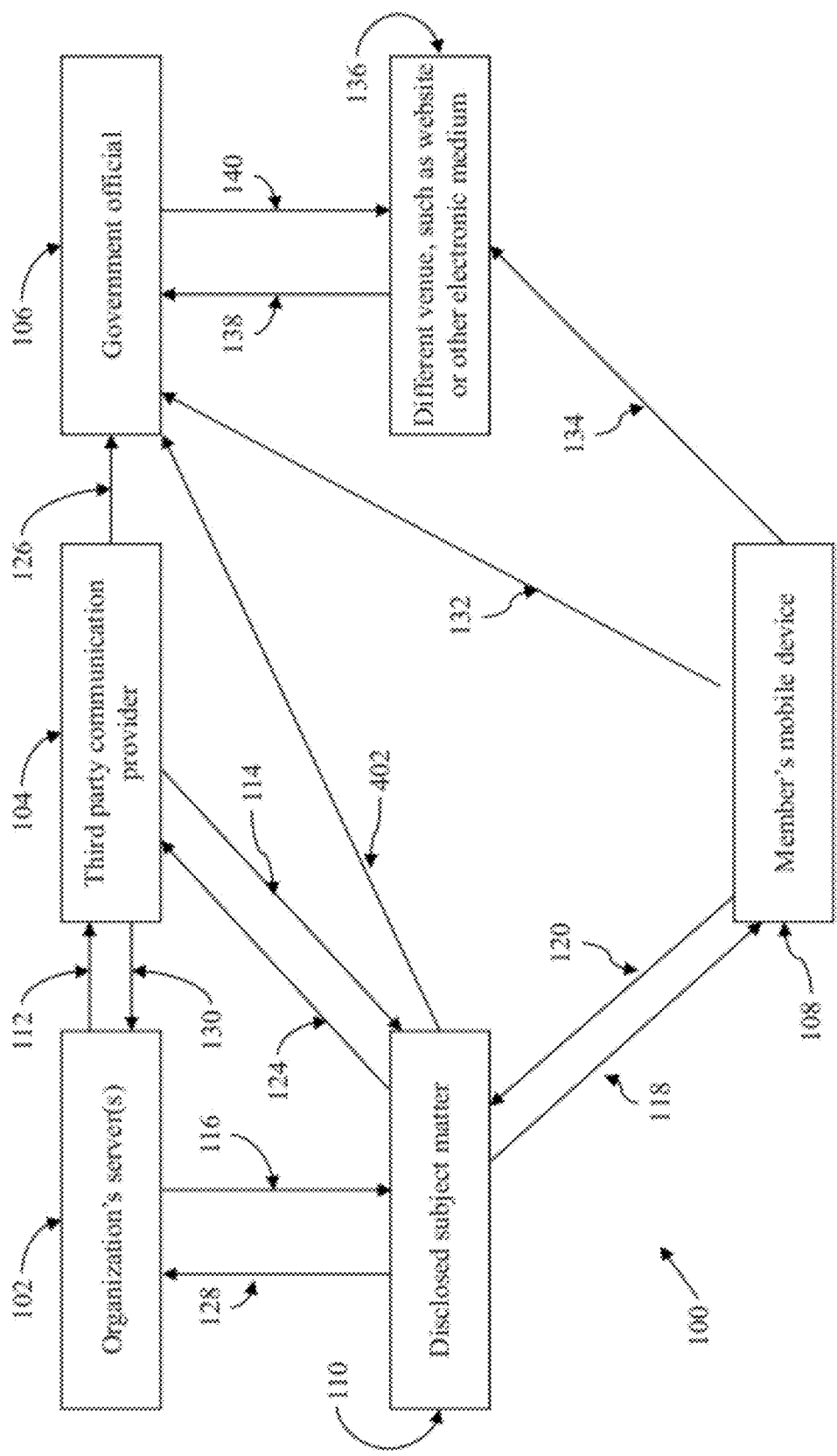
FIG. 1 is a flow diagram 100 detailing how information will flow among the disclosed subject matter, Organizations, members, Officials, and, if relevant, third party communication providers used by Organizations and other venues.

FIG. 1 is a visual representation of a system 100 where the disclosed subject matter facilitates communication between Organizations, the Organizations' members and Officials. The Organizations' own computer assets 102 will be used by the Organization to draft messages it wants sent to Officials or prompts to members to send messages created by the member to Officials or make such messages available to Officials. These messages can either be sent directly 116 to the disclosed subject matter 110 or sent through 112 a third party communications provider 104 that provides Organizations with distribution links to Officials among other services, which are frequently used by such Organizations. In addition, the messages can be sent to a separate venue, including but not limited to a website, bulletin board, message board or other electronic repository for viewing by 140, or forwarding to 138, the Official 136. The third party communications provider relays the message through its processes to the disclosed subject matter 114. Based upon information provided by members, including but not limited to the member's name, location, and relevant interests (see FIG. 2) 120, the disclosed subject matter will assess which members should be notified of the message by comparing its records of members who use the disclosed subject matter with the topic and intended target Officials of the message and send the message 118 to those members' mobile devices 108.

After the member uses the disclosed subject matter to determine an outcome on the message 120, the information is communicated to the target Official 106, either directly from the disclosed subject matter 122 or by a third party communications provider via application program interface "API" or other method 124 for forwarding to the Official 126. In addition, the member's actions, including providing feedback if requested by the Organization, is provided to the Organization, either directly to the Organization via software (proprietary or otherwise) 128 or via the Organization's third party communications provider 130.

Organizations will be able to use software (proprietary or otherwise) to draft and send messages or prompts directly to the disclosed subject matter 116 or, if they prefer, the disclosed subject matter can operate with third-party communication services, allowing the Organization to draft messages or prompts and select targets within the third party system 112, with additional inputs to take advantage of the disclosed subject matter's unique capabilities that will be communicated to the disclosed subject matter by the third party system 114. The disclosed subject matter then alerts the member to the Organization's message or prompt 118 via the member's mobile device using methods including but not limited to, one or more visual cues, auditory cues, vibrations, etc. The member can now decide what they wish to do with the Organization's message or prompt 120. If the member elects to send the Organization's message or create a message based on the Organizations prompt and send it to the Official, the disclosed subject matter can send the message directly via methods including but not limited to, one or more of: the disclosed subject matter interacting with the mobile device's organic email capability to prepopulate, address, and send the email to the Official 132; sending the selected message from the disclosed subject matter's email system, 122; or, if the Organization uses a third party communication provider, routing the message from the disclosed subject matter to this third party 124 or 136 via API or other method and then on to the Official 126 or 138. In the case of a member using the disclosed subject matter to create a message that is stored on a different venue (134 and 136) the disclosed subject matter will also be able to transmit a notification of the existence of a message directly to the Official, along with all necessary information, including but not limited to hyperlinks or other navigation 138 to enable the Official to become aware of the message and consume it on/from that different venue 140.

Regardless of what the member does with the Organization's message, metrics based on member response, and requests for more information from the member will be generated by the member's interaction with the disclosed subject matter 120, this information can be provided in a usable, analyzable format directly to the Organization via software (proprietary or otherwise) 128 or can be provided to the Organization's third party communication provider 124 to be provided to the Organization by the third party provider along with other data generated by that provider 130.

FIG. 2 is a flow diagram displaying a particular embodiment 200 of how the disclosed subject matter may determine which messages the member will receive. When the member downloads the disclosed subject matter to a mobile device, the member will initiate an account with identifying information used by the disclosed subject matter to fill in message details. The member can create an account by either creating a completely new account via their mobile device or using a preexisting account from another service (e.g. email, social network, Organization specific account, etc.), that includes a unique identifier for the disclosed subject matter, such as but not limited to, one or more of: a username and password, question and answer, or unique image identification 202. The disclosed subject matter could use a separate identifier unique to that mobile device, including but not limited to one or more identifiers such as IP addresses, MAC addresses, mobile phone numbers, or other identifying characteristics to ensure that only one account is active per mobile device to ensure that each message sent by the disclosed subject matter is sent by an actual person 204.

The member then enters a location via the mobile device or personal computer as part of the account creation process 206. This information is used by the disclosed subject matter to determine which Officials represent the member at the local, state, and national levels 208. The member then selects the Organizations from which he or she wishes to receive communications via the disclosed subject matter's menu and search system 210. The member, via the same system, can update this information later. The disclosed subject matter uses this information to determine which communications the member should receive 212.

After the member has selected the Organizations from which to receive messages, he or she is able to provide unique member identifiers used by the Organization, including but not limited to membership numbers or unique statuses (e.g., "Gold Member", "Trusted Advisor" etc.), and can select specific issue areas within the Organizations purview about which he or she wants to receive messages 214. The type of unique identifier and subject matter areas may be determined by each Organization based on its practices. The disclosed subject matter could use this information to refine which messages the member receives by allowing the Organization to specify in greater detail to whom a message should be routed based on factors including but not limited to membership level, specific member identification, or subject matter 216. All the information generated by the member (202, 206, 210, 214) will be stored by the disclosed subject matter (e.g. database on internal or external servers), that will allow the disclosed subject matter to maintain a persistent record of the member's relevant criteria to allow accurate routing of messages and identification of the member 218.

FIG. 3 is a flow chart describing a particular embodiment of how the disclosed subject matter will determine which members will receive a message from an Organization 300. The Organization, using software, including but not limited to the disclosed subject matter's proprietary software, third party communication software, or software proprietary to the Organization, all of which is interoperable with the disclosed subject matter via methods including but not limited to APIs, will select which Officials it wants to ultimately receive messages 302. In response to this, the disclosed subject matter will determine, using the information provided by members (see FIG. 2), which members are constituents of the target Officials 304.

The Organization can also use subject matter and/or member designations, including but not limited to membership numbers or unique statuses (see FIG. 2, 214) to refine further which members should receive the message 306. The disclosed subject matter will then compare the Organization's input with the information provided by members (see FIG. 2) to determine which members meet the Organization's member designations and/or have elected to receive messages on the relevant subject matter 308.

Once the Organization drafts its message(s) and publishes them to the disclosed subject matter, either directly, via third party communication provider, or by another means 310, the disclosed subject matter will, using the analysis demonstrated in 304 and 308, only publish the message to those members who have elected to receive those messages and are constituents of the relevant Officials 312.

Figure 4A:
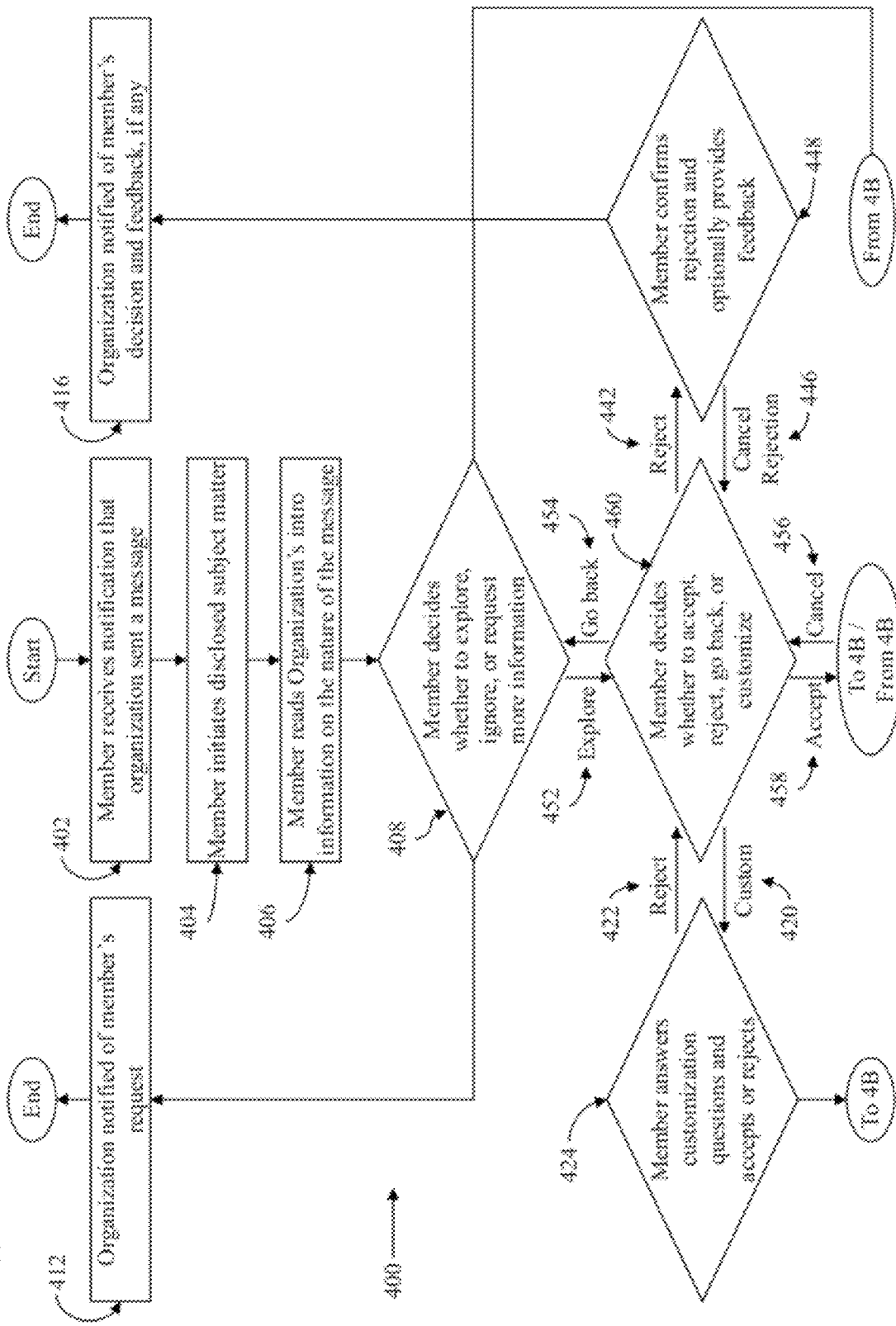
FIG. 4 is a flow diagram 400 of how a member may use a particular embodiment of the disclosed subject matter, the choices they will have available to them, and the resulting outcomes of those choices.
Figure 4B:
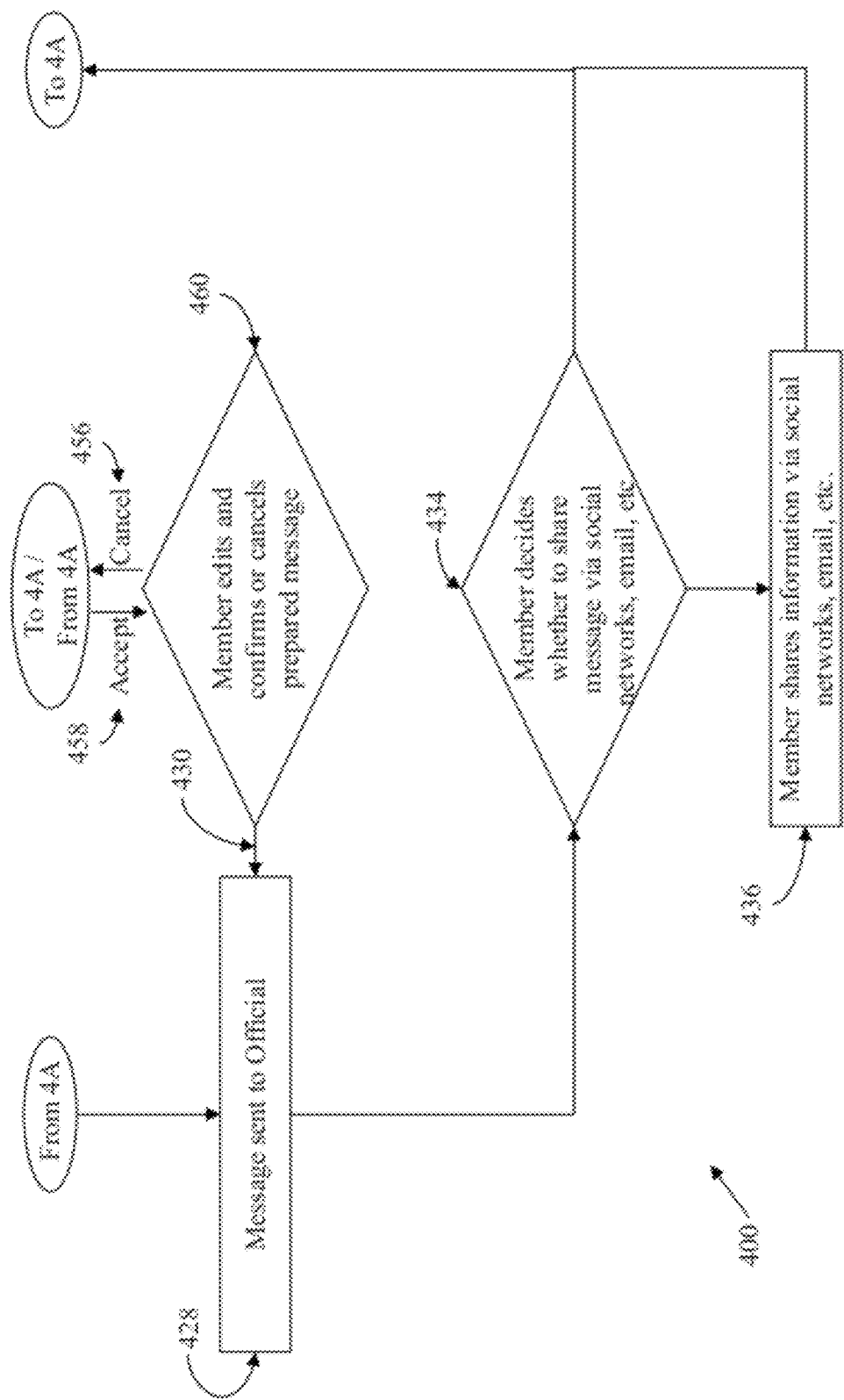

FIG. 4 is a flow chart describing a particular embodiment of the user experience for a member using the disclosed subject matter 400. This particular embodiment assumes that the Organization intends the member to send an email message to his or her Official. However, the disclosed subject matter can also accommodate other types of messages, including but not limited to telephonic and visual messages, the process for which would be similar but not identical.

In this embodiment, the member will receive a notification on his or her mobile device alerting the member that an Organization from which he or she has elected to receive communications has sent a message 402. The notification can include but is not limited to: a noise generated by the mobile device, a visual cue such as a flashing light, pictogram, or number, or a tactile alert such as vibration. Once the member is alerted that he or she has received an alert he or she can initiate the process (e.g., begin running the program or open the program on a mobile device) by providing the appropriate input 404.

Once the member has initiated the process, the member will be able to consider some introductory information, created by the Organization to inform the member of the nature of the message that was sent 406. This introductory information may include but is not limited to one or more of the following: text, audio information, photographic/pictorial information or videos. After evaluating the Organization's introductory information the member can decide to request more information from the Organization via the disclosed subject matter, ignore the Organization's request that the member act on its message, or further inspect the message 408.

If the member elects to request more information from the Organization he or she can input such a decision on the disclosed subject matter 410, which will then notify the Organization, for example, through: direct communication via proprietary software, communication with a third party communications provider (see FIG. 1, 104), the disclosed subject matter initializing the member's email application on the member's mobile device to send a prepared email to the Organization, the disclosed subject matter allowing the member to send an audio or video message to the Organization, the disclosed subject matter using its own email assets to contact the Organization 412, etc. After this request is processed the member's session with regard to this message is over.

If the member elects to ignore the message the member can input their choice on their mobile device 414. The Organization will then be informed by the disclosed subject matter, for example, by direct communication via proprietary software, communication with a third party communications provider (see FIG. 1, 104), the disclosed subject matter initializing the member's email application on their mobile device to send a prepared email to the Organization, the disclosed subject matter allowing the member to send an audio, video message to the Organization or the disclosed subject matter using its own email assets to contact the Organization 416, etc. After the decision is processed by the disclosed subject matter the member's session with regard to this message is over.

If the member elects to explore further the Organization's message he or she can input that choice into the mobile device 452. The member will then be provided with additional information about the issue for which the Organization seeks action and the member's options 418. If the member elects to go back to the previous menu (408) he or she can make that input and return 454. If the member decides to send a custom message he or she can make the appropriate input 420 and will enter a message generation interface (see FIG. 24) 424. From this screen the member will have the option to cancel the custom message 422 and return to the previous menu (418) or build and confirm a custom message using the message generation capabilities of the disclosed subject matter and his or her own inputs to draft and edit the message as desired 426. If the custom message is confirmed, it is sent to the appropriate Official, for example, via the disclosed subject matter interacting with the mobile device's organic email capability to prepopulate and address the email to the Official to send the selected message from the disclosed subject matter's email system, or, if the Organization uses a third party communication provider the message can be routed from the disclosed subject matter to this third party via API or other method and then on to the Official 428.

If the member elects to send a prepared message 458 he or she will be taken to a screen where the prepared message can be reviewed and edited 460. The member will be able to cancel the prepared message and return to the previous screen (418) by making the appropriate input 456. If the member elects to confirm the message he or she can enter the appropriate input 430 and the message will be sent to the appropriate Official, for example, via the disclosed subject matter interacting with the mobile device's organic email capability to prepopulate and address the email to the Official send the selected message from the disclosed subject matter's email system, or, if the Organization uses a third party communication provider the message can be routed from the disclosed subject matter to this third party via API or other method and then on to the Official 428.

After the member has confirmed and sent either a custom (426) or prepared (430) message he or she will have the option of publishing a message to other individuals the member knows 434. The published message could be one prepared by the Organization as part of its message drafting process or by the member, or a combination of the two. If the member elects to share information, this sharing will be accomplished by the disclosed subject matter utilizing and interfacing with various programs, including but not limited to, one or more: social networks, political computer programs, and the mobile device's email program 436. If the member declines to share this information 438, it is not shared. In addition, when a member elects to send either a custom (426) or prepared (430) message, the Organization will be provided information, including but not limited to, one or more of: which prepared message (if any) was sent, which selections were made as part of the custom message generation process, what edits, if any, were made by the member, the sender of the message and the recipient of the message 416. This information is provided to the Organization by the disclosed subject matter via direct communication via proprietary software, communication with a third party communications provider (see FIG. 1, 104), the disclosed subject matter initializing the member's email application on his or her mobile device to send a prepared email to the Organization, the disclosed subject matter allowing the member to send an audio or video message to the Organization, the disclosed subject matter using its own email assets to contact the Organization 440, etc. After the decision is processed by the disclosed subject matter the member's session with regard to this message is over.

If the member elects to reject the Organization's message he or she can make the appropriate input on the mobile device 442 where he or she will be taken from the selection screen (418) to a screen where he or she is asked to confirm his or her rejection of the message and provide feedback 448. From this screen the member can cancel the rejection 446 and return to the previous screen (418) or confirm the rejection and provide feedback by making the appropriate inputs 450. The Organization will then be informed of the decision and/or feedback, for example, by direct communication via proprietary software, communication with a third party communications provider (see FIG. 1, 104), the disclosed subject matter initializing the member's email application on the member's mobile device to send a prepared email to the Organization, the disclosed subject matter allowing the member to send an audio or video message to the Organization, the disclosed subject matter using its own email assets to contact the Organization 416, etc. After the decision is processed by disclosed subject matter the member's session with regard to this message is over.

FIG. 5 is a visual representation of a particular embodiment of a graphical interface used by the disclosed subject matter to allow a member to create an account 500. This particular embodiment displays fields for inputting information necessary to allow the disclosed subject matter to categorize properly the member for relevant message delivery (see FIG. 2) and fill in personal data in future messages from Organizations from the member's mobile device using appropriate input methods 502. It should be noted that mobile devices are not the only devices that can be used to create an account with the disclosed subject matter and other devices will include, but are not be limited to, personal computers and the like. It should also be noted that the fields displayed in this particular embodiment (e.g., name, zip code, sex, etc.) are not the only fields that the disclosed subject matter may collect, but merely provide a few examples and should not be considered limiting in any manner. The disclosed subject matter also includes a way for a member to use a third party account, including but not limited to a social network account, to allow the member to create an account and provide the disclosed subject matter with the information necessary for the disclosed subject matter to properly serve the member 504. After the member has entered all relevant data he or she will be able to make an appropriate input to progress in the account creation process 506.

Figure 6:
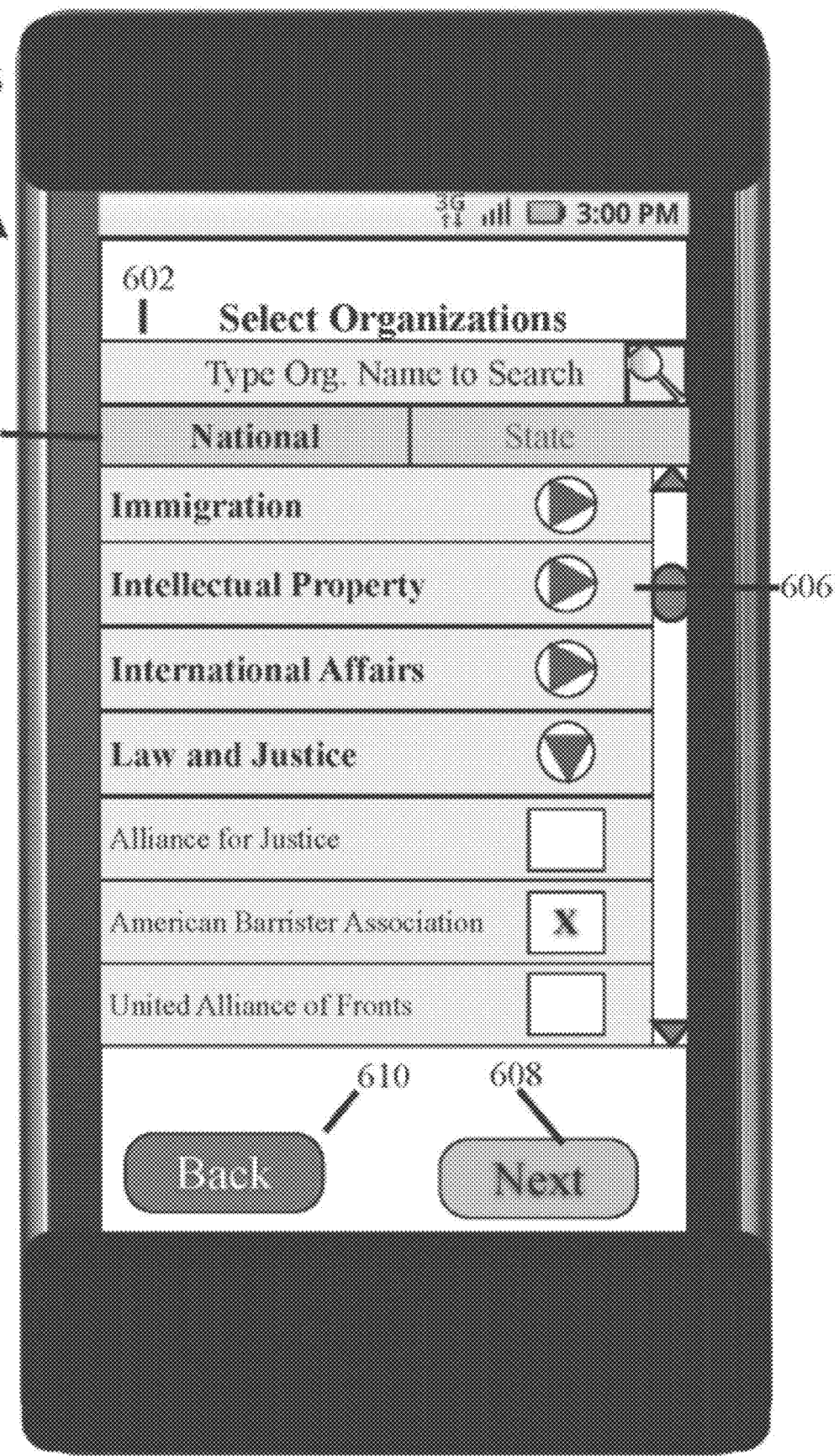
FIG. 6 is an illustration of a particular embodiment of a selection interface 600 used by the member to determine from which Organizations the member wants to receive notifications.

FIG. 6. is a visual representation of a particular embodiment of a graphical interface used by the disclosed subject matter to allow a member to create an account 600. This particular embodiment displays fields that allow the member to input information necessary to allow the disclosed subject matter to further categorize the member properly for relevant message delivery (see FIG. 2), and to fill in personal data in future messages from Organizations from his or her mobile device using appropriate input methods. This screen shows the disclosed subject matter allowing the member to select the Organizations from which he or she wishes to receive messages. The member will be able to search for particular Organizations by name by inputting relevant information (e.g., the name of the Organization, the first several letters of the Organization, etc.) 602. In an alternative embodiment, the member may input topical or subject matter keywords related to an Organization and select from a list of Organizations purporting to address those keywords. The member will also be able to select between national and state level Organizations by making the appropriate input 604 (local Organizations could also be implemented). Once a member has determined whether he or she wishes to look at national or state level Organizations he or she will be able to navigate via a series of menus to find the Organizations in which he or she is interested. 606. The Organizations could be sorted by relevant factors including but not limited to issue area, geography, membership size, partisan affiliation (if any), etc. Once the member has selected the Organization(s) he or she wishes to follow, he or she will be able to make the appropriate input to progress in the account creation process 608. In the alternative, if the member wishes to change his or her membership information (see FIG. 5) he or she will be able to make the appropriate input for that as well 610.

Figure 7:
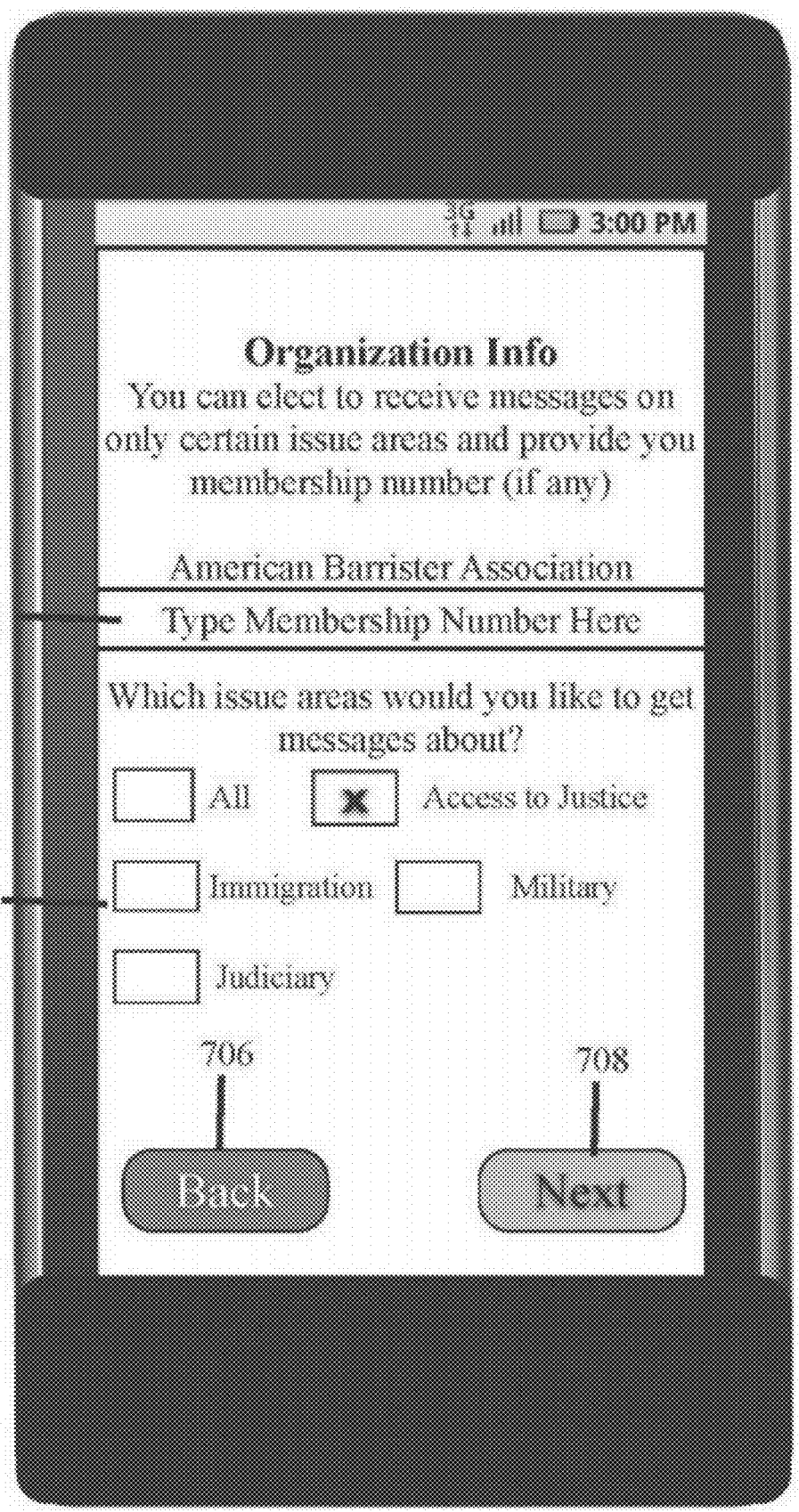
FIG. 7 is an illustration of a particular embodiment of an interface 700 a member will use after selecting the option to receive information from a particular Organization to refine his or her relationship with the Organization.

FIG. 7 is a visual representation of a particular embodiment of a graphical interface used by the disclosed subject matter to allow a member to create an account 700. This particular embodiment displays fields for inputting information necessary to allow the disclosed subject matter to properly categorize the member for relevant message delivery (see FIG. 2) and fill in personal data in future messages from Organizations from a mobile device using appropriate input methods. This screen shows a particular embodiment of the process of creating a member account for the disclosed subject matter that allows the member to input a unique identifier for a particular Organization of which he or she is a member, including but not limited to a membership ID number 702. This screen also shows the disclosed subject matter's ability to allow the member to select certain subject matter areas, provided by the Organization, to further narrow the scope of messages the member will provide 704. At the time or after the member makes these selections he or she will be able to go back to change his or her membership data or the Organizations from which he or she wishes to receive feeds 706 or progress in the account creation process 708.

Figure 8:
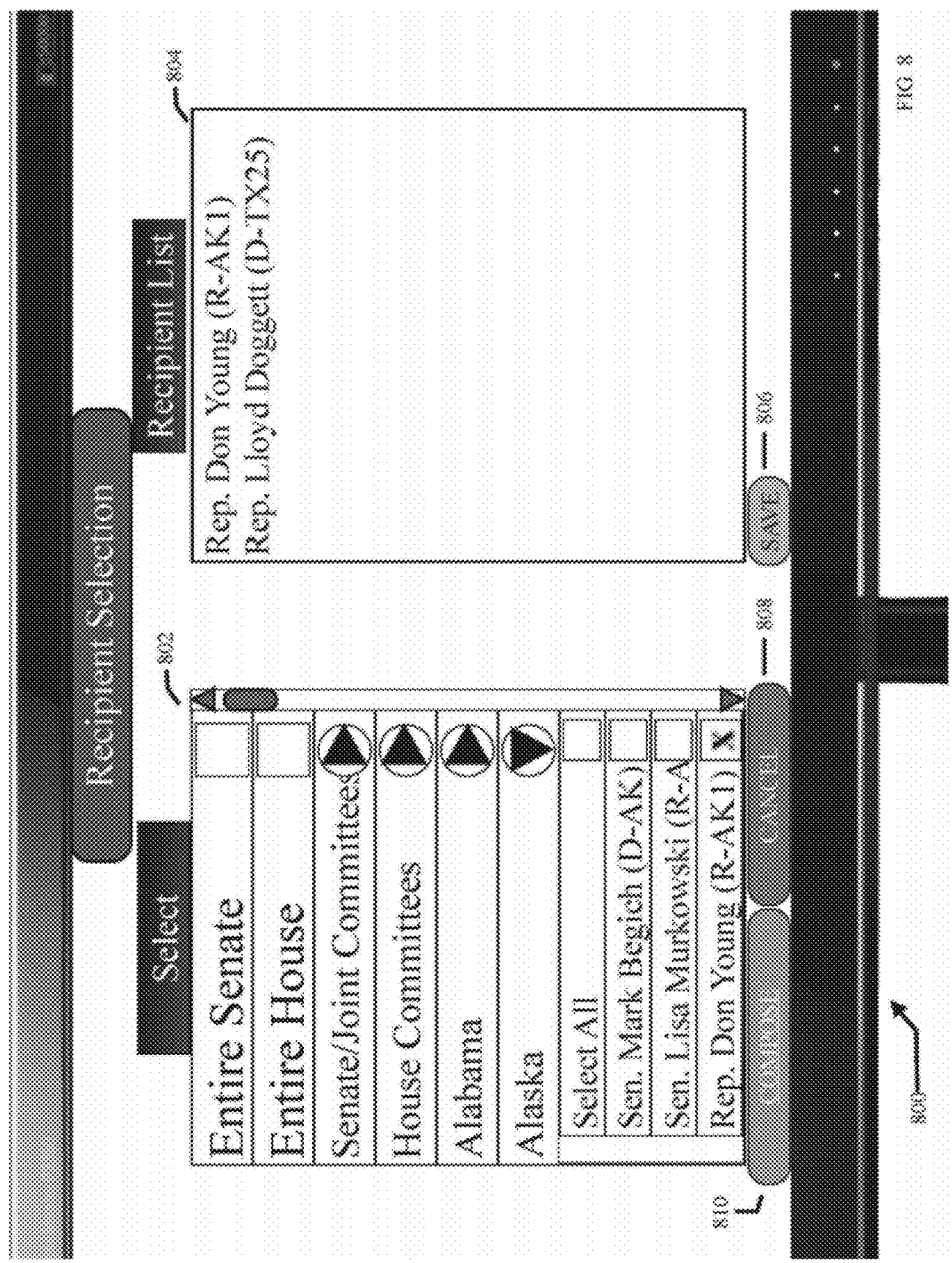
FIG. 8 is an illustration of a particular embodiment of an interface 800 that allows the Organization to select which Officials should receive messages from Organization members.

FIG. 8. is a visual representation of a particular embodiment of a graphical interface used by the disclosed subject matter to allow Organizations to create messages for distribution to the members that will ultimately be sent from their members to select Officials 800. This particular embodiment represents an interface that allows the Organization to decide which Officials it wants to target to receive the message 802. This embodiment displays the use of a series of drop down menus with members of the U.S. Congress organized by state; however this system is not limited to the use of drop down menus or to the U.S. Congress and could also include one or more: Officials within the Executive branch of the United States Federal Government (e.g., the President, Vice President, the First Spouse, Executive Agency Officials), state government Officials, local Officials, members of the state or federal judiciary, foreign government Officials, or other pertinent persons. This embodiment also displays a separate display for which Officials have actually been selected by the Organization 804 and the ability for the Organization to save such a list for further use 806. This particular embodiment of the disclosed subject matter also displays a method for the Organization to cancel a recipient list 808. After the Organization has generated its list it will be able to progress to creating messages for distribution via the disclosed subject matter to its members 810.

It should be noted that although the depicted embodiment presents only an example of the disclosed subject matter, and is displayed as being installed and running on a personal computer. This aspect of the disclosed subject matter is not limited to personal computers and also includes but is not limited to web-based, network based, and mobile device based applications.

Figure 9:
FIG. 9 is an illustration of a particular embodiment of an interface 900 that allows the Organization to draft a prepared message and specify what type of personal information about the member should be filled in automatically.

FIG. 9 is a visual representation of a particular embodiment of a graphical interface used by a particular methodology of the disclosed subject matter to allow Organizations to create messages for distribution to the members that will ultimately be sent from their members to select Officials 900. This particular embodiment represents an interface that allows the Organization to input a draft of a prepared message to be sent to members so the members can send them to the relevant Official 902. This embodiment displays the disclosed subject matter's ability to allow the Organization to create fields within the message that will be automatically populated by the disclosed subject matter based on information provided by members (see FIG. 1, 128 and FIG. 2) to personalize the message to those members' names, locations, and other types of information via a method such as, but not limited to, a mail-merge style database 904. This particular embodiment also displays the disclosed subject matter's ability to allow Organizations to create a space where the member can personalize a portion of the prepared message by inputting the appropriate information through a mobile device 906.

This particular embodiment also displays a particular methodology used by the disclosed subject matter to enable Organizations to tag messages based on the subject matter of the message 908. This allows the disclosed subject matter to route the message more accurately to only those members who have elected to receive messages about that subject matter (see FIG. 7, 704 and FIG. 2, 214 and 216). Also displayed is a particular methodology for allowing the Organization to draft a message the member can use to share with other networks of which the member may be part, including but not limited to social networks, political websites, and email 910. The displayed embodiment of the disclosed subject matter also contains a methodology for the Organization to save messages, either on the Organization's own machines, their own servers, the disclosed subject matter's servers for access via the internet or other communication medium, or other storage medium for future use, editing and/or compliance 912. After drafting a prepared message the Organization will be able to "publish" the message via the disclosed subject matter to the appropriate members based on factors including, but not limited to, one or more of: whether the member is a constituent of the target Official, the member's geographic location, what members have elected to receive messages about the designated subject matter of the message, etc. 914.

It should be noted that although the depicted embodiment presents the disclosed subject matter installed and running on a personal computer, this aspect of the disclosed subject matter is not limited to personal computers and also includes but is not limited to web-based, network based, and mobile device based applications.

Figure 10:
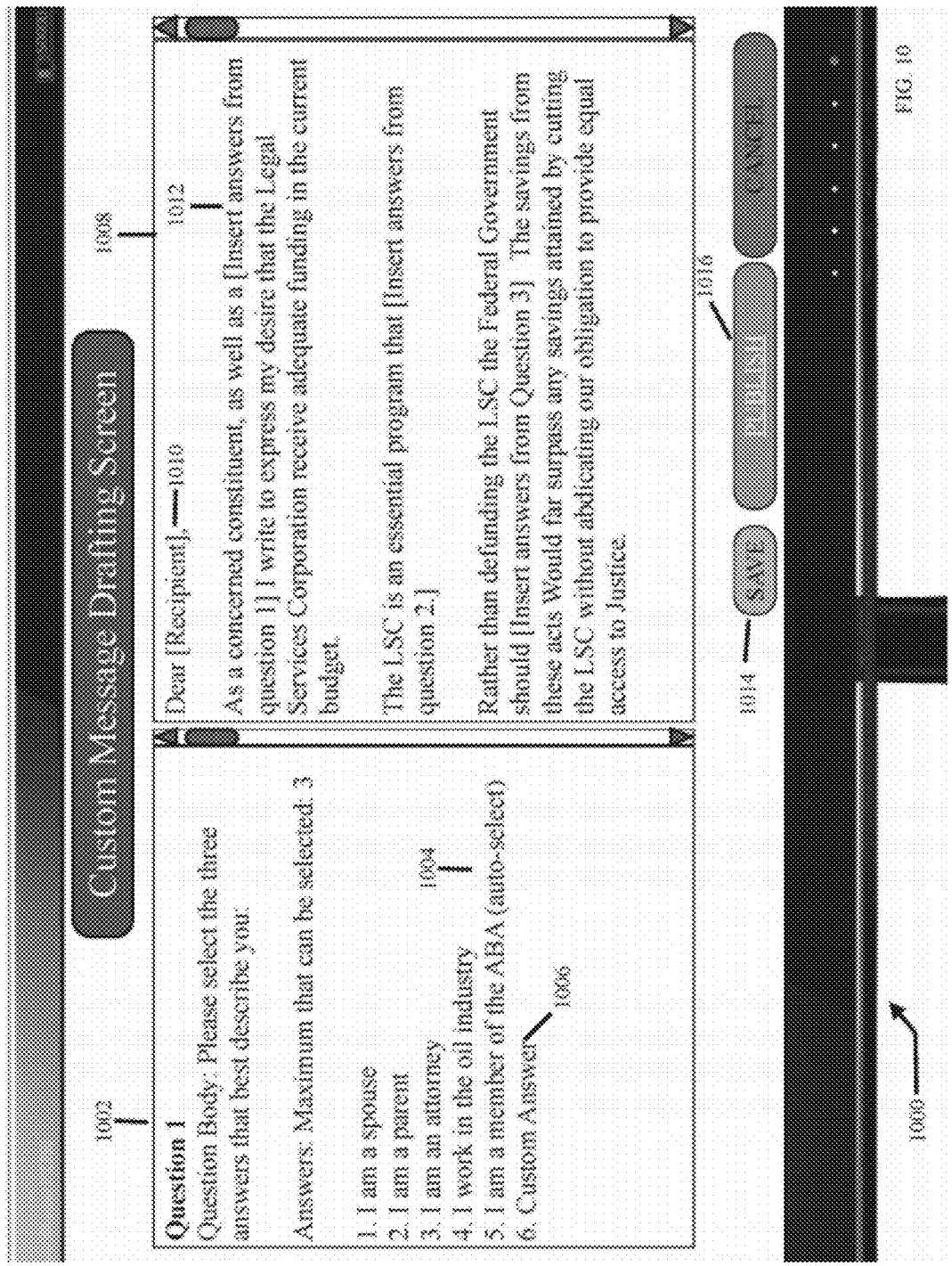
FIG. 10 is an illustration of a particular embodiment of an interface 1000 that allows the Organization to construct a list of questions and a message framework that will be used by members to create a custom message.

FIG. 10 is a visual representation of a particular embodiment of a graphical interface used by a particular methodology of the disclosed subject matter to allow Organizations to create messages for distribution to their members, which the members will be able to customize via answering questions and inputting text, with the messages ultimately being sent by members to select Officials 1000. This particular embodiment includes a capability for the Organization to draft questions for the member to answer 1002 that will be used to fill in the member's message 1010. This embodiment of the disclosed subject matter also contains the ability for the Organization to have certain answers automatically selected, allowing the member to opt out of that answer if desired 1004 or allow the member to insert a custom answer via input on the member's mobile device 1006.

This embodiment also displays a methodology for the Organization to draft a framework for a custom message that includes spaces for the member's answers to the Organization's questions 1002 to be filled in automatically by the disclosed subject matter 1008. This methodology allows certain details in the message, including but not limited to the name of the member, the Official to whom the message is being directed, and the relevant geographic location to be filled in automatically by the disclosed subject matter based on details provided by the member during the account creation process (see FIG. 2) 1010 as well as answers generated by the member when he or she answered the Organization's questions 1012. The displayed embodiment of the disclosed subject matter also contains a methodology for the Organization to save messages, on the Organization's own machines, its own servers, the disclosed subject matter's servers for access via internet or other communication medium, or other storage medium for future use, editing and/or compliance 1014. After drafting a prepared message the Organization will be able to "publish" the message via the disclosed subject matter to the appropriate members based on factors including but not limited to, one or more of: whether the member is a constituent of the target Official, the member's geographic location, whether the topic of the message is among those on which the member has elected to receive messages, etc. 1016.

It should be noted that although the depicted embodiment presents the disclosed subject matter installed and running on a personal computer this aspect of the disclosed subject matter is not limited to personal computers and also includes, but is not limited to, web-based, network based, and mobile device based applications. It should be noted that the disclosed subject matter will also contain certain capabilities not shown in this particular embodiment, including but not limited to, one or more of: the ability for an Organization to embed a phone number in the message to allow the member to call instantly the number from a mobile device with telephonic capability (including online telephony) or for the Organization to embed audio or video messages to the member, either for the member's own viewing or for forwarding to others.

Figure 11:
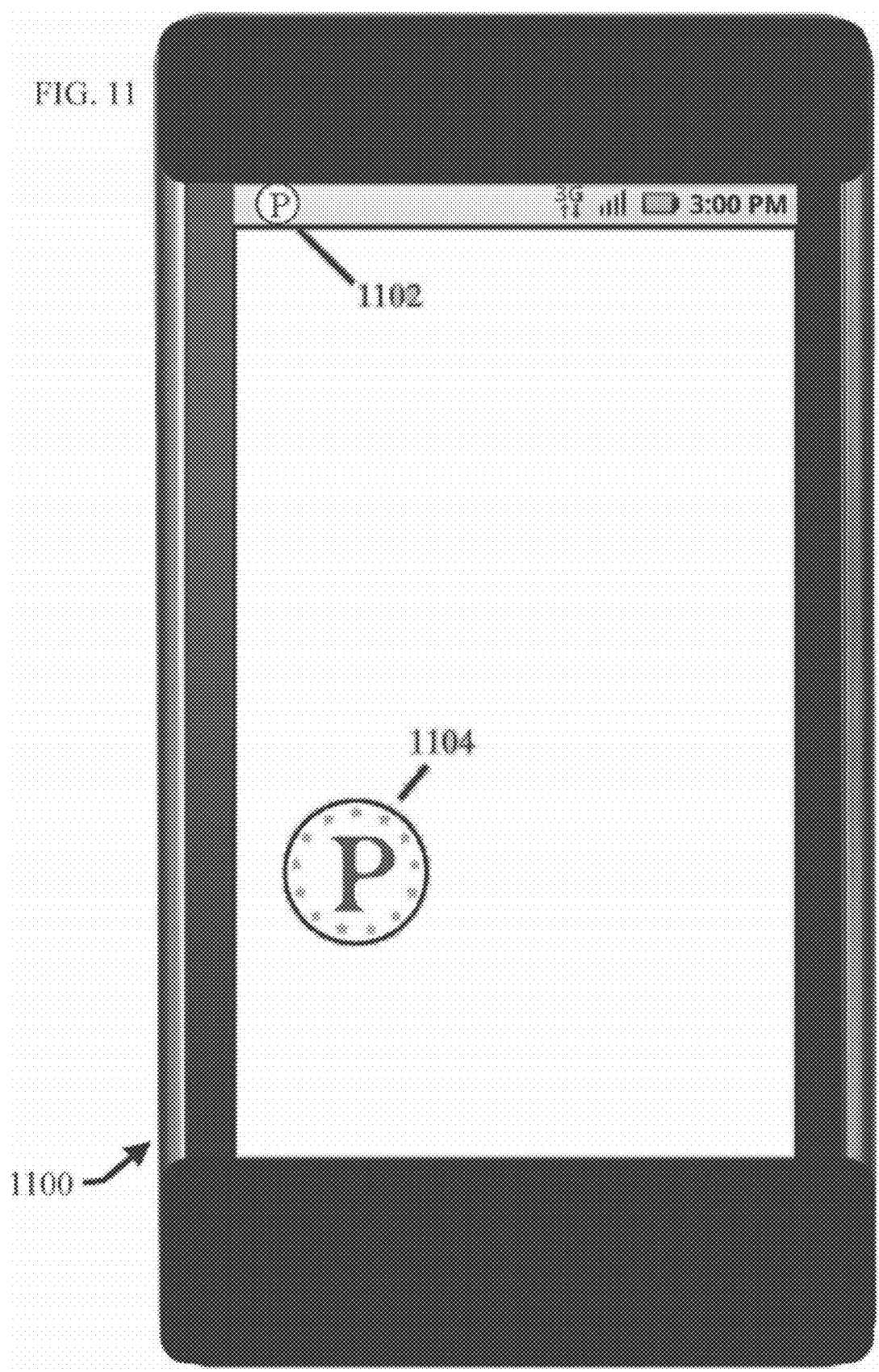
FIG. 11 is an illustration of a particular embodiment of a visual representation 1100 provided by the disclosed subject matter to alert a member that an Organization has sent a notification and is requesting the member's action.

FIG. 11 is a visual representation of a particular embodiment of the disclosed subject matter operating on a particular mobile device 1100. This particular embodiment displays a methodology for the disclosed subject matter notifying the member that he or she has received a message by producing a specific visual signal on the mobile device 1102. While this particular embodiment displays a particular visual notification the disclosed subject matter is not limited to this type of notification and can utilize other means of notification including but not limited to other visual cues (e.g., a flashing light, a "splash screen" on the screen of the mobile device), audio notifications, tactile notifications (e.g., shaking or "buzzing"), or email or other means of communication.

This particular embodiment also displays a particular methodology for the disclosed subject matter to be displayed on a mobile device when it is not in use via an icon on the device's screen that allows the member to initialize the disclosed subject matter via the appropriate input 1104. The disclosed subject matter is not limited to this methodology for display and may use other methodologies.

Figure 12:
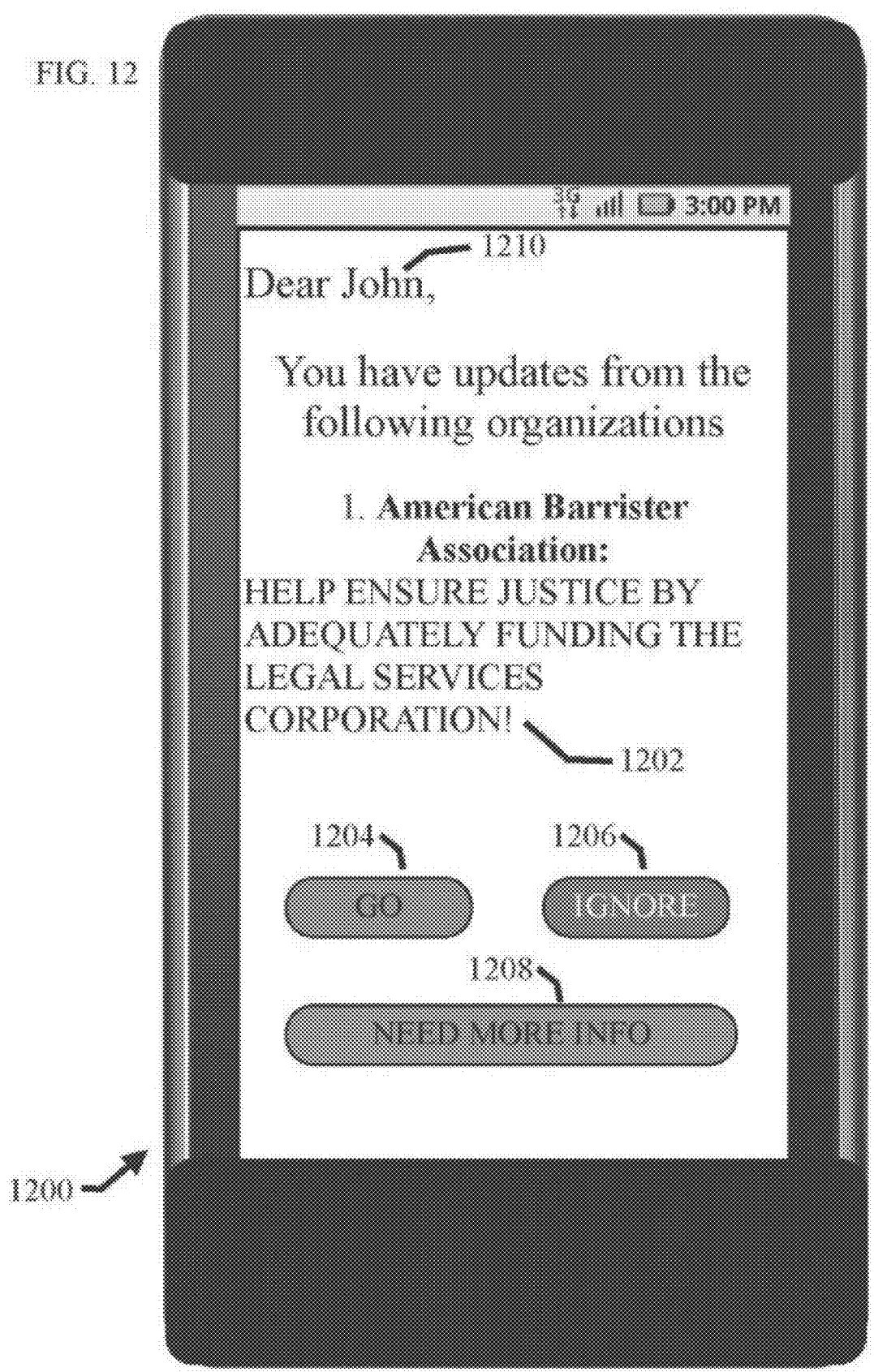
FIG. 12 is an illustration of a particular embodiment of an interface 1200 the member will use to select whether to ignore an Organization's request for action, request additional information from the Organization, or begin the process of acting on the action alert.

FIG. 12 is a visual representation of a particular embodiment of the disclosed subject matter operating on a particular mobile device 1200. This particular embodiment displays a methodology for the member, via appropriate input, to react to a message sent by an Organization that requests action 1202 by electing to investigate further the Organization's message 1204, ignore the message, 1206 or request more information from the Organization on the subject of the message 1208. This embodiment also displays the disclosed subject matter's ability to utilize information provided by the member during the account creation process (see FIG. 2) to personalize messages sent to members by including specific information, including but not limited to the member's name and location 1210.

Figure 13:
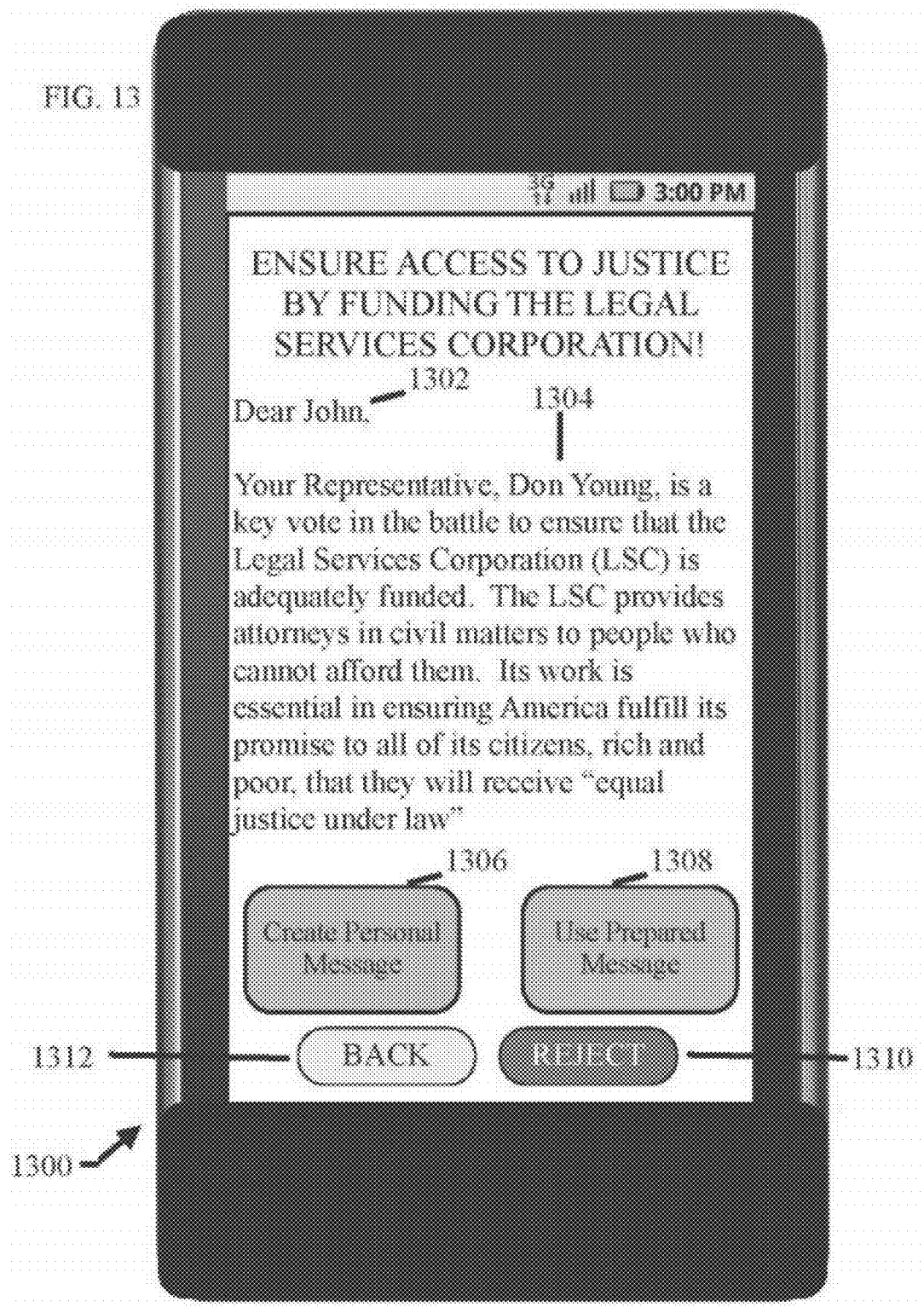
FIG. 13 is an illustration of a particular embodiment of an interface 1300 the member will use to read additional information provided by the Organization about the subject of the action request and select whether to send a prepared message, a custom message, or reject the message.

FIG. 13 is a visual representation of a particular embodiment of the disclosed subject matter operating on a particular mobile device 1300. This particular embodiment displays a methodology for the member, via appropriate input, to react to a message sent by an Organization that requests action. This particular embodiment displays the disclosed subject matter's ability to personalize messages sent to members by including specific information, including but not limited to the member's name and location 1302. In this particular embodiment the member is able to read an explanatory message from the Organization 1304 and determine what action to take within the disclosed subject matter by entering the proper input. This particular embodiment relates to a written message and allows the member to elect to send a custom message 1306, send a message prewritten by the Organization 1308, reject the Organization's request 1310, or return to the previous screen (see FIG. 12) to request additional information or take a different action 1312.

Figure 14:
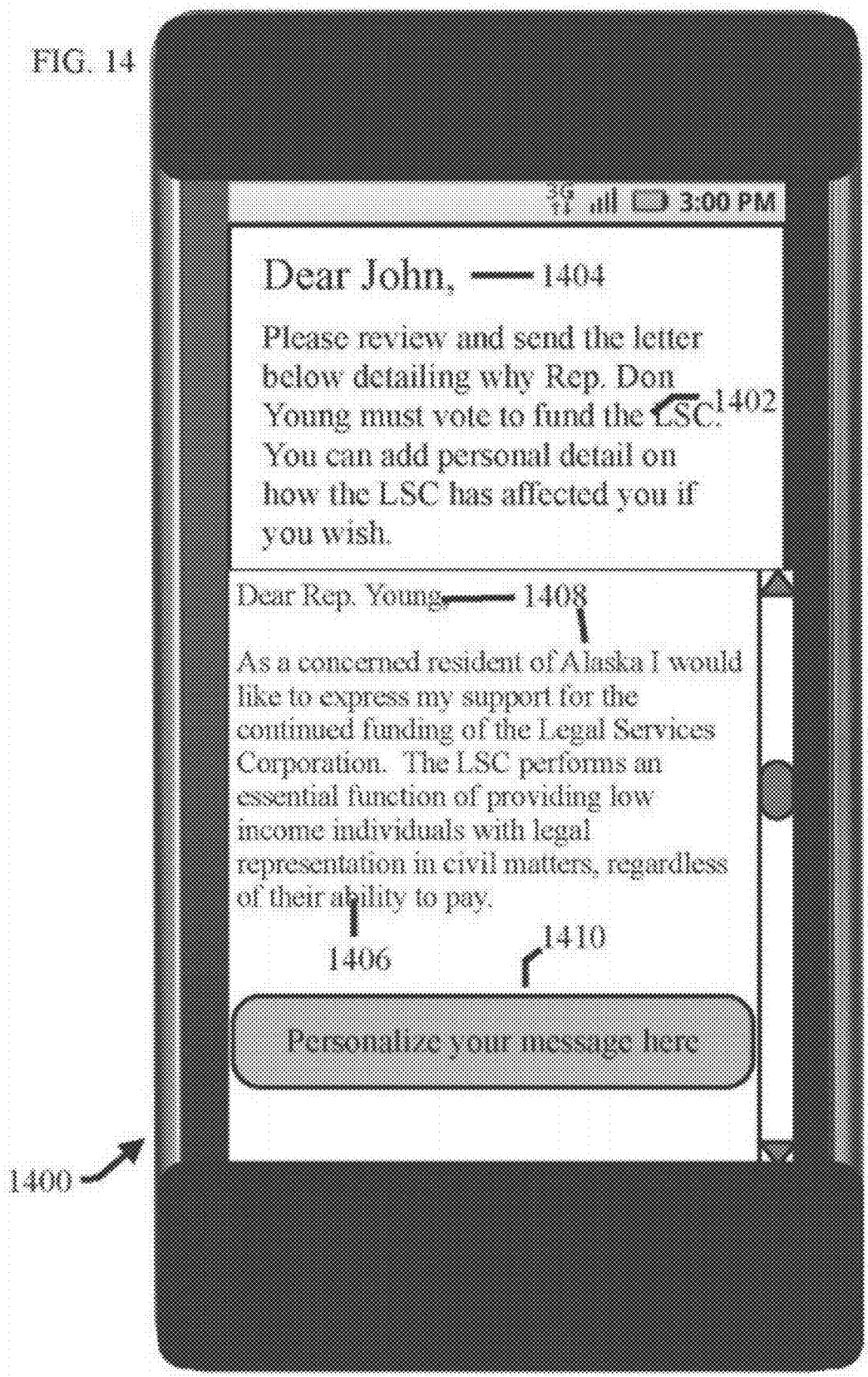
FIG. 14 is an illustration of a particular embodiment of an interface 1400 that the member will use to review the message prepared by the Organization, that has certain personal information held by the disclosed subject matter automatically inserted and insert additional text if the Organization has provided for it.

FIG. 14 is a visual representation of a particular embodiment of the disclosed subject matter operating on a particular mobile device 1400. This particular embodiment displays a methodology for the member, via appropriate input, to review and edit a message prepared by an Organization (see FIG. 9, 902) if the member elected to send such a message (see FIG. 13, 1308). This representation displays the disclosed subject matter's ability to allow the Organization to present the member with introductory and guidance information 1402 that is automatically customized by the disclosed subject matter to reflect the member's personal details, including but not limited to the member's name and location, provided by the member during the account creation process (see FIG. 2) 1404.

This embodiment also displays the disclosed subject matter's ability to present the member with the message the Organization has drafted (see FIG. 9, 902) 1406 with the fields the Organization choose to allow the disclosed subject matter to fill automatically, in this case the name of the Official to whom the member will be sending the message and the location of the member (compare to FIG. 9, 904) correctly filled in based on the Organization's targeting 1408 and sending of the message to the right constituent. This embodiment also displays the disclosed subject matter's ability to allow members to edit specific parts of the message if the Organization allows (compare FIG. 9, 906) 1410.

Figure 15:
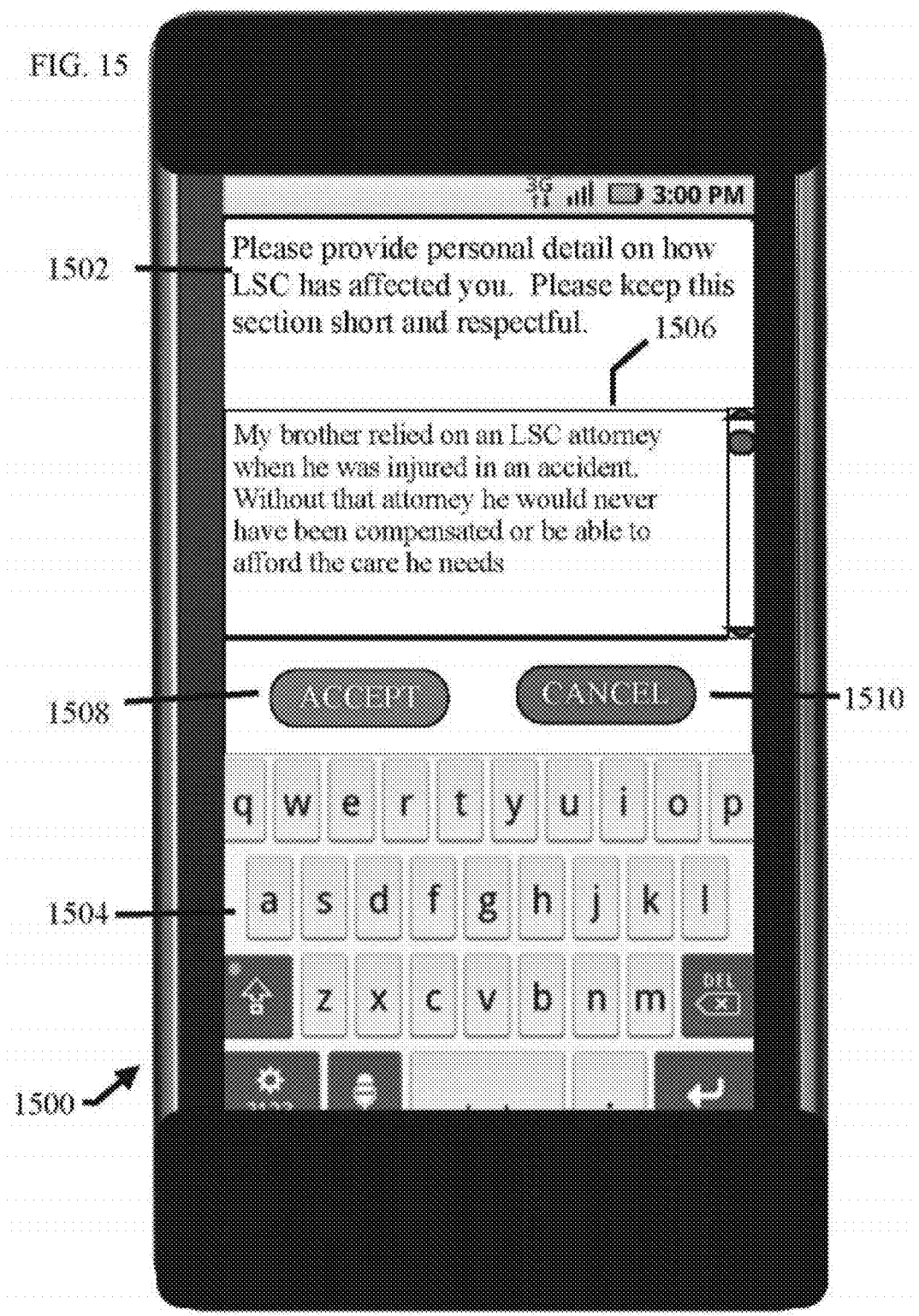
FIG. 15 is an illustration of a particular embodiment of an interface 1500 that the member will use to edit the message prepared by the Organization.

FIG. 15 is a visual representation of a particular embodiment of the disclosed subject matter operating on a particular mobile device 1500. This particular embodiment displays a methodology for the member, via appropriate input, to review and edit a message prepared by an Organization (see FIG. 9, 902) if the member elected to send such a message (see FIG. 13, 1308). This representation displays the Organization's ability to provide the member with guidance for the member's edits 1502. This representation also displays the use of the mobile device's touchscreen keyboard to allow the member to input desired edits 1504. It should be noted that the member can use other methods to provide input, including but not limited to attached physical keyboards and other devices, wireless keyboards and other devices, styluses, voice commands, or tactile input such as touching, shaking or bumping the device, or other input methods.

This embodiment of the disclosed subject matter also displays its ability to allow the member to review edits visually prior to incorporation into the message 1506. After the member inputs desired edits the disclosed subject matter provides the option of either accepting the edits and incorporating them into the message 1508 or canceling the editing process and returning to the prepared message without edits (see FIG. 14) 1510 via appropriate input.

Figure 16:
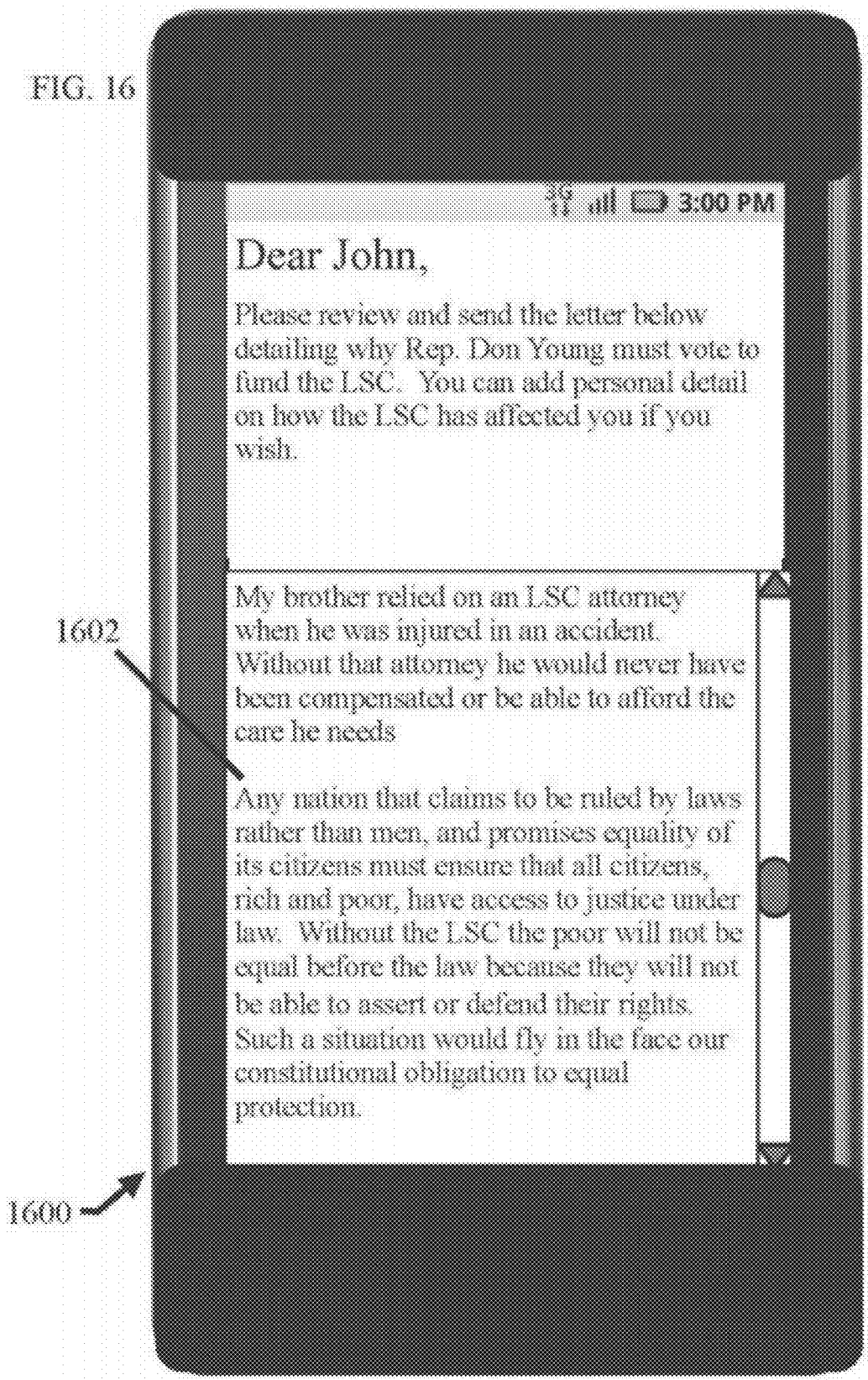
FIG. 16 is an illustration of a particular embodiment of an interface 1600 that the member will use to review the message prepared by the Organization.

FIG. 16 is a visual representation of a particular embodiment of the disclosed subject matter operating on a particular mobile device 1600. This particular representation displays the disclosed subject matter's ability to incorporate instantly the member's edits (see FIG. 15) into the prepared message that the member can then review, continue to edit, or send 1602.

Figure 17:
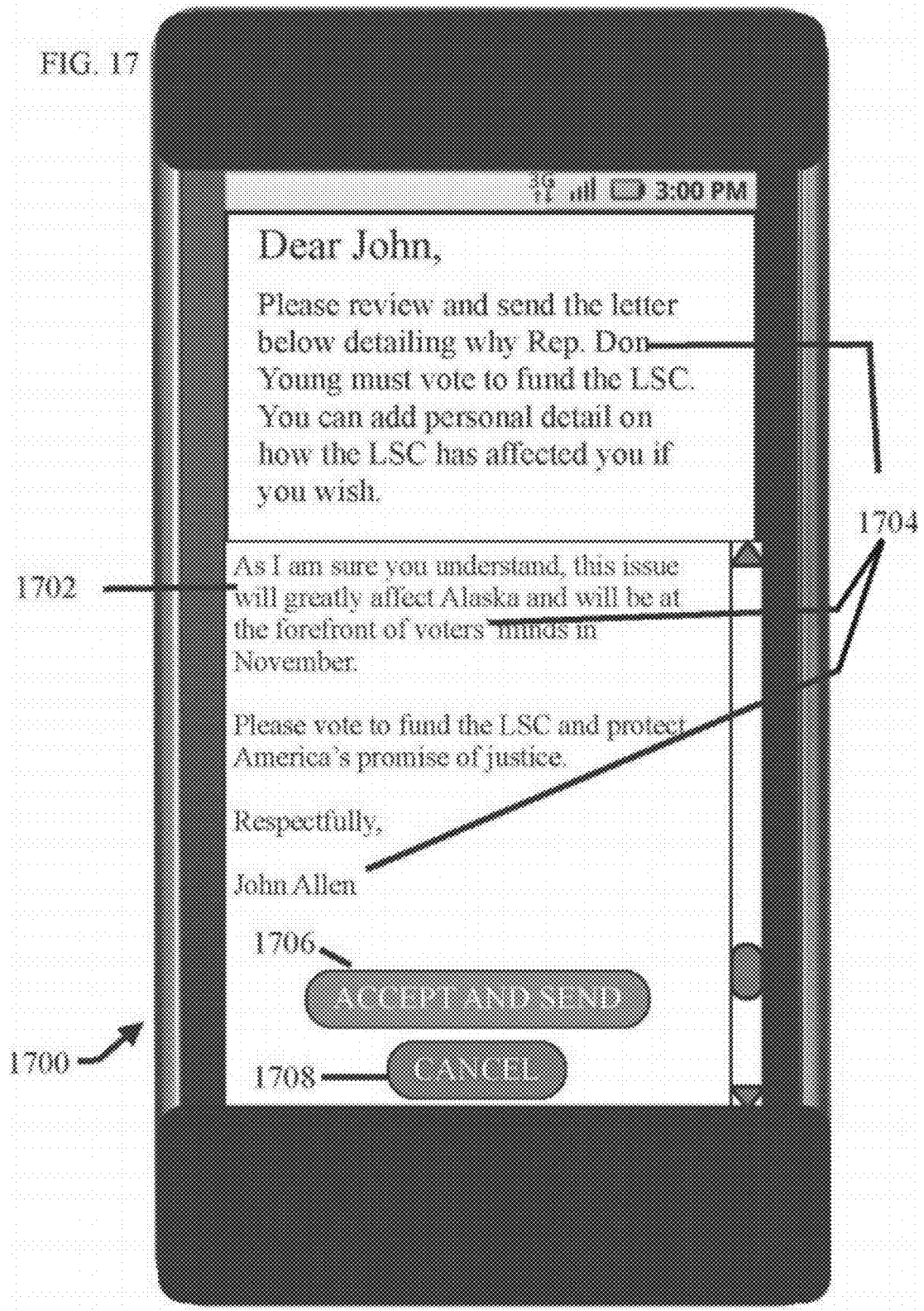
FIG. 17 is an illustration of a particular embodiment of an interface 1700 that the member will use to review the message prepared by the Organization.

FIG. 17 is a visual representation of a particular embodiment of the disclosed subject matter operating on a particular mobile device 1700. This representation displays the disclosed subject matter's ability to provide the member with the Organization's prepared message (see FIG. 9, 902) 1702, automatically customized with certain details, including but not limited to the member's name, relevant Official, and location by using information provided by the member during the account creation process (see FIG. 2) 1704. If the member approves the message he or she can accept it by providing the appropriate input and taking the action desired by the Organization, in this embodiment sending the message to a specific Official 1706. If the member does not want to accept the message he or she can provide the appropriate input and be returned to the part of the disclosed subject matter's process where members can elect whether to take a specific action, in this case sending a message, or reject the Organization's request (see FIG. 13) 1708.

Figure 18:
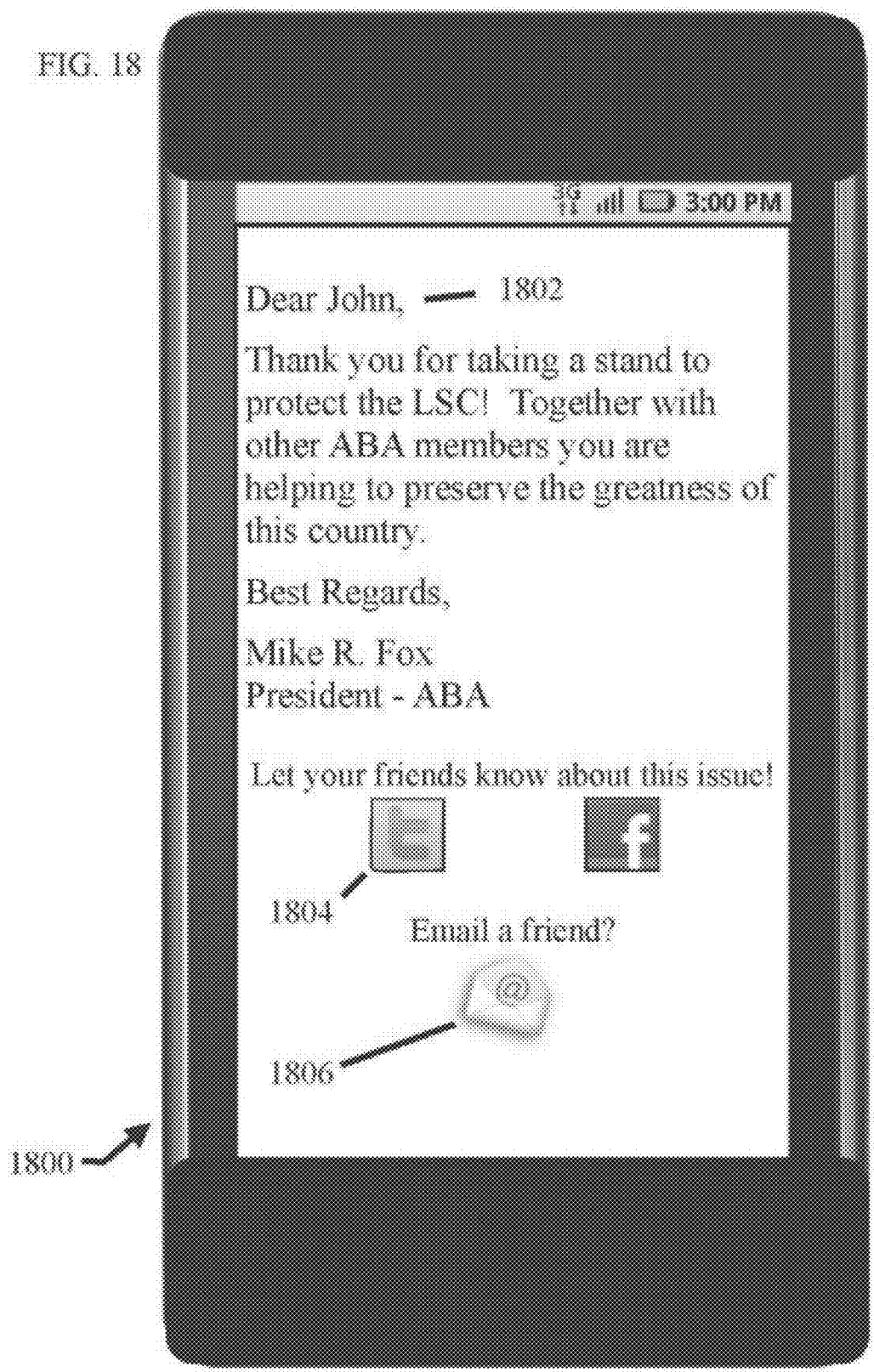
FIG. 18 is an illustration of a particular embodiment of an interface 1800 that the member will use to receive thanks from the Organization that is personalized via the disclosed subject matter.

FIG. 18 is a visual representation of a particular embodiment of the disclosed subject matter operating on a particular mobile device 1800. This particular representation displays a methodology for the disclosed subject matter to improve Organizations' ability to maintain relationships with their members by allowing the Organizations to, via the disclosed subject matter, provide personalized thank you messages by using information provided by the member as part of the account creation process (see FIG. 2) 1802. This representation also shows the disclosed subject matter's ability to allow members, after making the appropriate input, to notify others of the actions they took via interacting with third party programs, including but not limited to social networks via the use of APIs and other means 1804 and interacting with the mobile device's email functionality directly 1806.

It should be noted that the disclosed subject matter's ability to facilitate personal messages from the Organization to the member is not limited to messages where the Organization thanks the member for sending a message and can include other topics.

Figure 19:
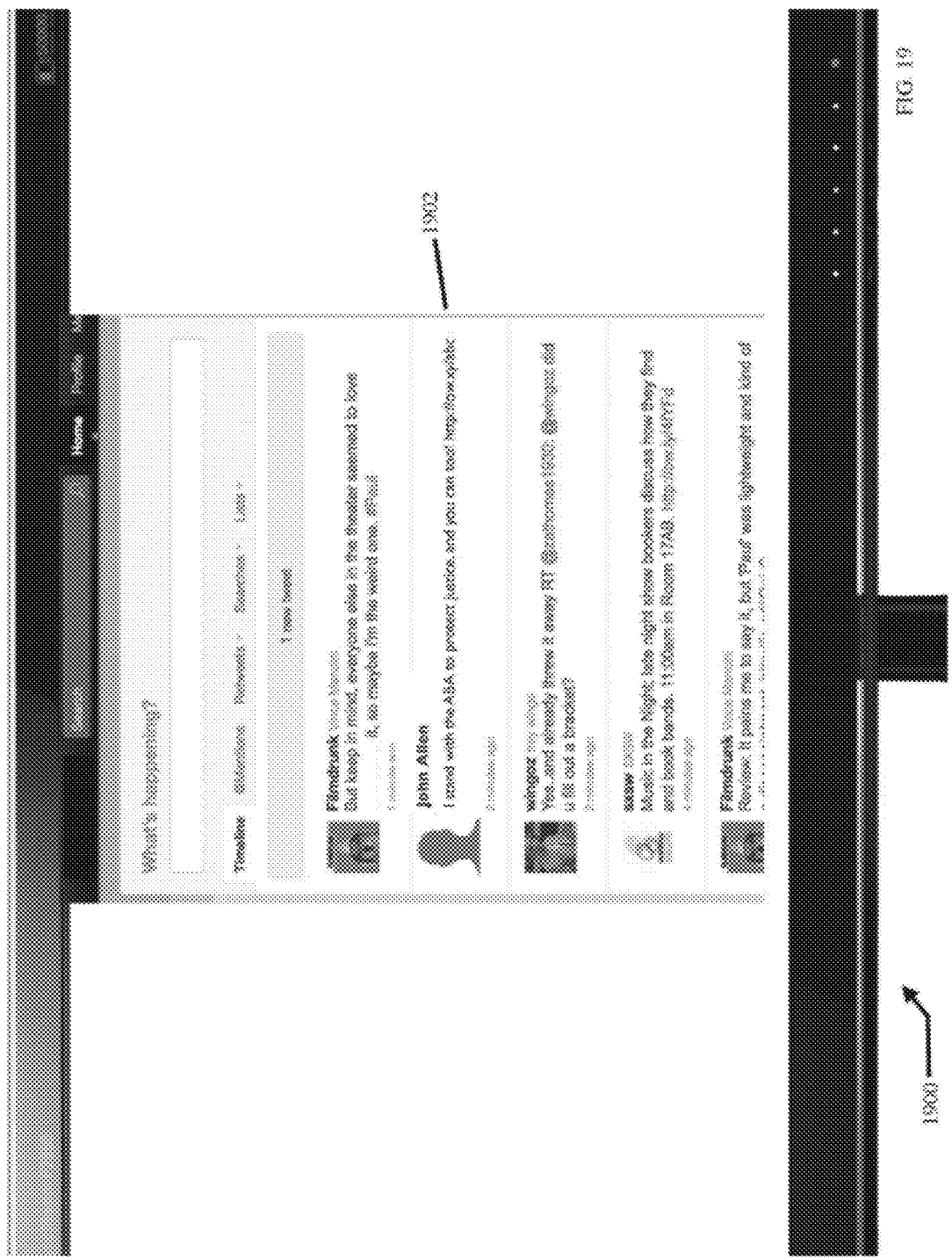
FIG. 19 is an illustration of a particular embodiment of an interaction between the disclosed subject matter and a member's social network account 1900 in response to the member's election to share his action via the disclosed subject matter (see FIG. 15).

FIG. 19 is a visual representation of a methodology used by an embodiment of the disclosed subject matter that allows the member to inform others in his various networks of the relevant issue for which the Organization sought action 1900. In this particular representation the member has used the disclosed subject matter to post a message to his social network account (see FIG. 18, 1804) that was drafted by the Organization (see FIG. 9, 910) that contains a URL provided by the Organization to have the member's friends get more information from the Organization on the relevant topic 1902.

Figure 20:
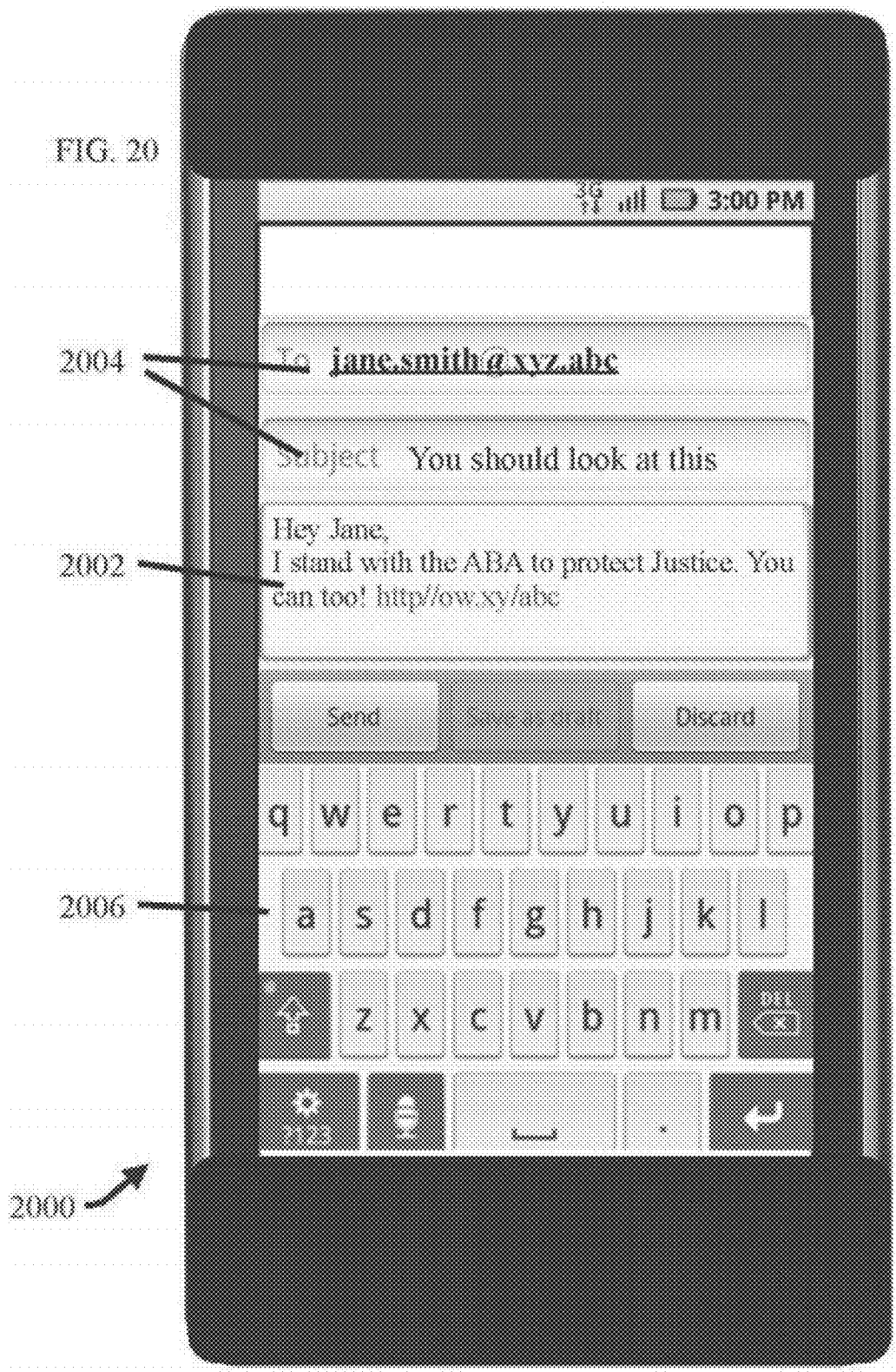
FIG. 20 is an illustration of a particular embodiment of an interaction 2000 between the disclosed subject matter and the member's email client on his mobile device.

FIG. 20 is a visual representation of a methodology used by an embodiment of the disclosed subject matter that allows the member to inform others in his various networks of the relevant issue for which the Organization sought action 2000. In this particular representation the member has used the disclosed subject matter's ability to interact with the mobile device's email functionality (see FIG. 18, 1806). The disclosed subject matter is able to prepopulate the email's body with a message drafted by the Organization (see FIG. 9, 910) for which the member can provide an address and subject 2002 as well as edit the body itself 2004. The disclosed subject matter can accept input from methods including but not limited to the mobile device's touchscreen keyboard 2006, an attached keyboard or other input device, a wireless keyboard or other input device, a stylus, the mobile device's touch screen, voice input, tactile input (e.g., shaking or bumping), or other input method.

Figure 21:
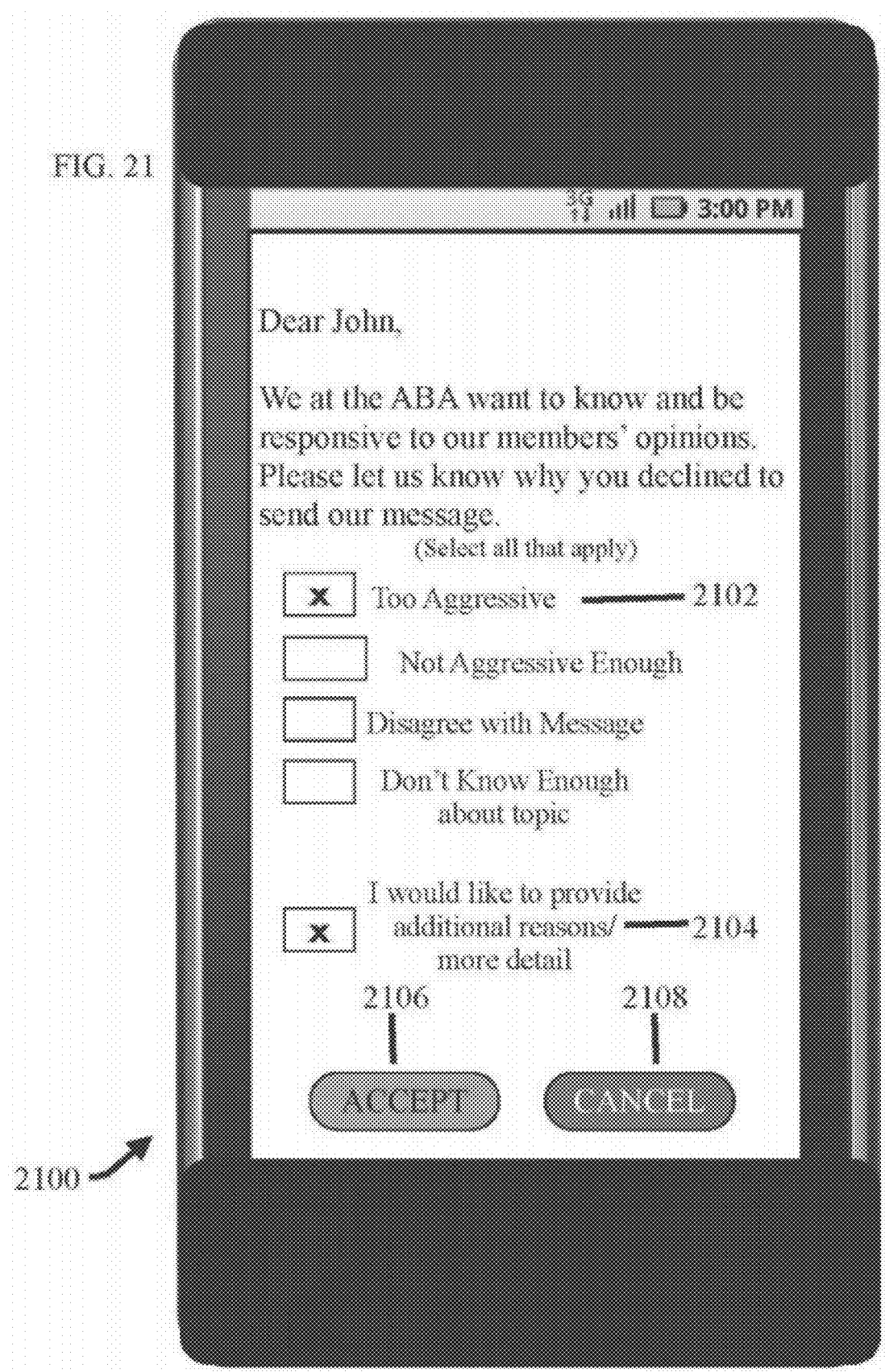
FIG. 21 is an illustration of a particular embodiment of an interface 2100 that the member will use to provide the Organization with feedback if the member elects to reject a message.

FIG. 21 is a visual representation of a methodology used by an embodiment of the disclosed subject matter that allows members to reject an Organization's request for a particular action (see FIG. 13, 1310) and provide feedback to the Organization explaining why 2100. The disclosed methodology allows members, via appropriate input, to select answers provided by the Organization 2102 and/or elect to provide additional custom reasons 2104. If the member wishes to confirm their rejection of the Organization's request they can do so by entering the appropriate input 2106. Likewise, if the member decides he or she does not wish to reject the message after all, he or she can, via the appropriate input, return to the portion of the disclosed subject matter where the member can decide what he or she wants to do with the request for action (see FIG. 13) 2108.

Figure 22:
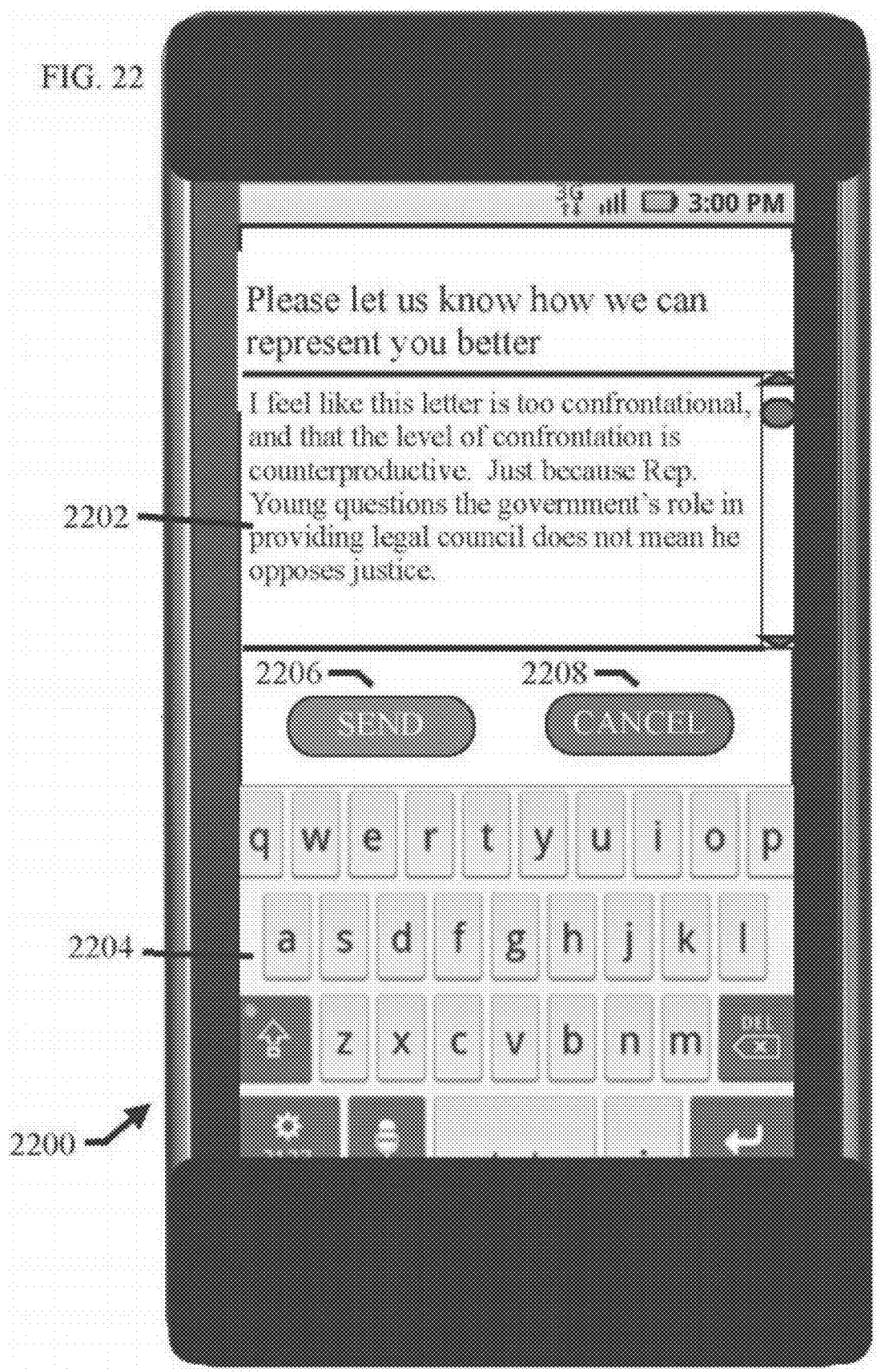
FIG. 22 is an illustration of a particular embodiment of an interface 2200 that the member will use to provide an Organization with custom detail as to why the member rejected the Organizations message.

FIG. 22 is a visual representation of a methodology used by an embodiment of the disclosed subject matter that allows members to provide personal reasons for rejecting an Organization's request for action 2200. In this particular embodiment of the disclosed subject matter the member is able to create written feedback via appropriate input 2202, in this case via the mobile device's touchscreen keyboard 2204.

If the member decides they want to send their comments to the Organization they can enable the disclosed subject matter via entering the appropriate input 2206 or, if they decide they do not want to provide personalized feedback they can via entering the appropriate input 2208 and be returned to previous screen (see FIG. 21).

Figure 23:
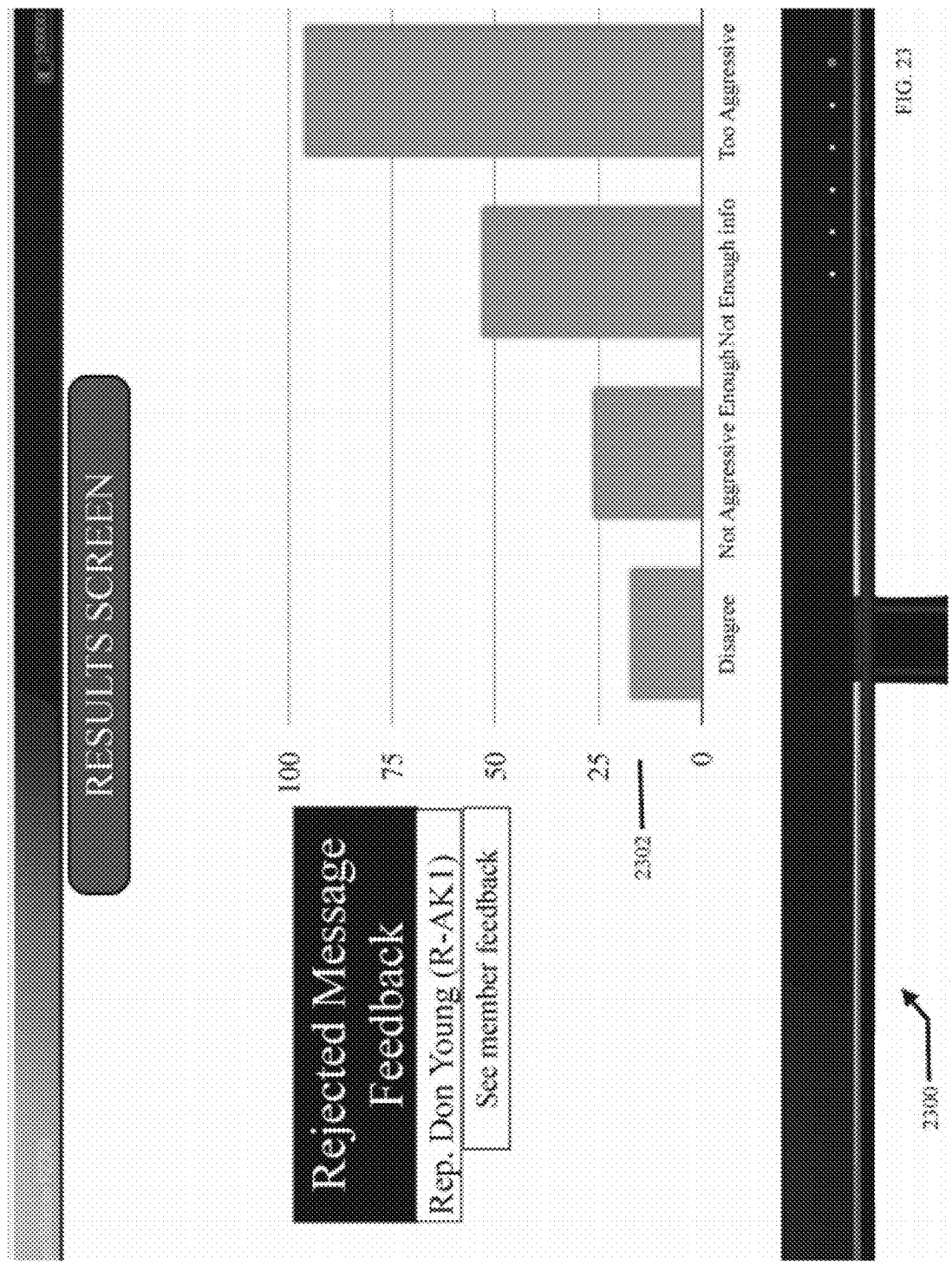
FIG. 23 is an illustration of a particular embodiment of a results screen 2300 that allows the Organization to see and analyze information generated by the members' interactions with the disclosed subject matter, including but not limited to accepting prepared messages, rejecting messages and providing feedback, and answering questions to generate custom messages.

FIG. 23 is a visual representation of a particular embodiment of the disclosed subject matter that allows Organizations to receive, categorize, monitor, and utilize member feedback 2300. This particular representation reflects the disclosed subject matter's ability to provide Organizations with representation and analysis of data created by members selecting different reasons they rejected an Organization's request for action (see FIG. 21, 2102) 2302. The disclosed subject matter's ability to provide the Organization with meaningful data drawn from member action is not limited to member reasons for rejections and includes data including, but not limited to, one or more of: which prepared messages have been sent, by whom, and to whom, members' answers to questions used to build custom responses, the full text of member's messages, etc.

It should be noted that although the depicted embodiment presents the disclosed subject matter installed and running on a personal computer, this aspect of the disclosed subject matter is not limited to personal computers and also includes but is not limited to web-based, network based, and mobile device based applications.

Figure 24:
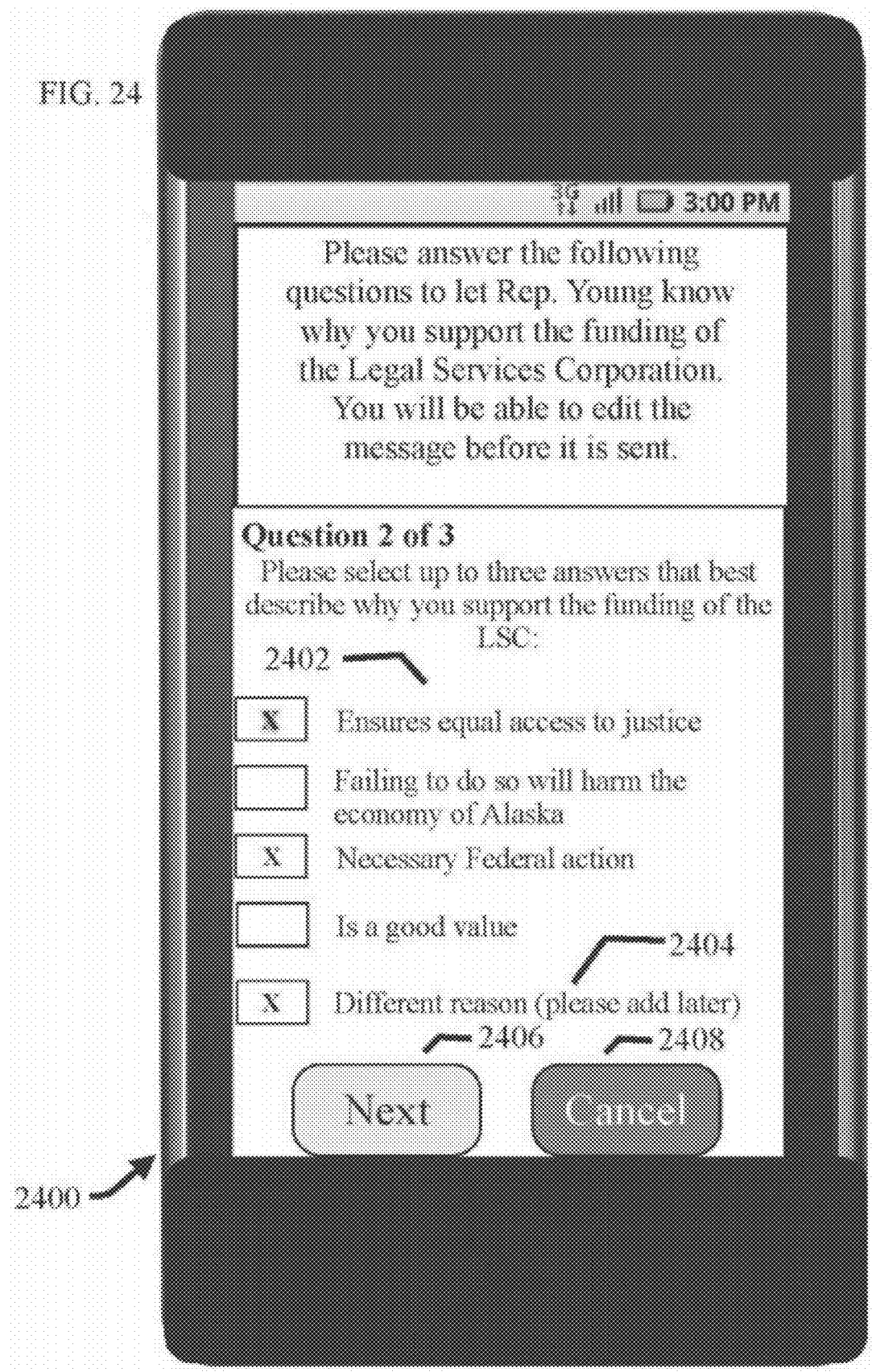
FIG. 24 is an illustration of a particular embodiment of an interface 2400 for the disclosed subject matter that the member will use to create a custom message for delivery to the relevant Official.

FIG. 24 is a visual representation of a particular embodiment of the disclosed subject matter that allows members to create custom messages 2400 via answering questions drafted by the Organization (see FIG. 10, 1002) by making the appropriate input on the mobile device 2402. If the member wishes to provide a different answer than the Organization provided he or she could make the appropriate input to do so 2404. This particular representation displays a session of the disclosed subject matter where the member has answered the second of three questions. If the member wishes to progress to the third question he or she can by making the appropriate input 2406 or, if the member decides not to, he or she can cancel the process and return to the screen where he or she can select how to respond to the Organization's request (see FIG. 13) 2408.

Figure 25:
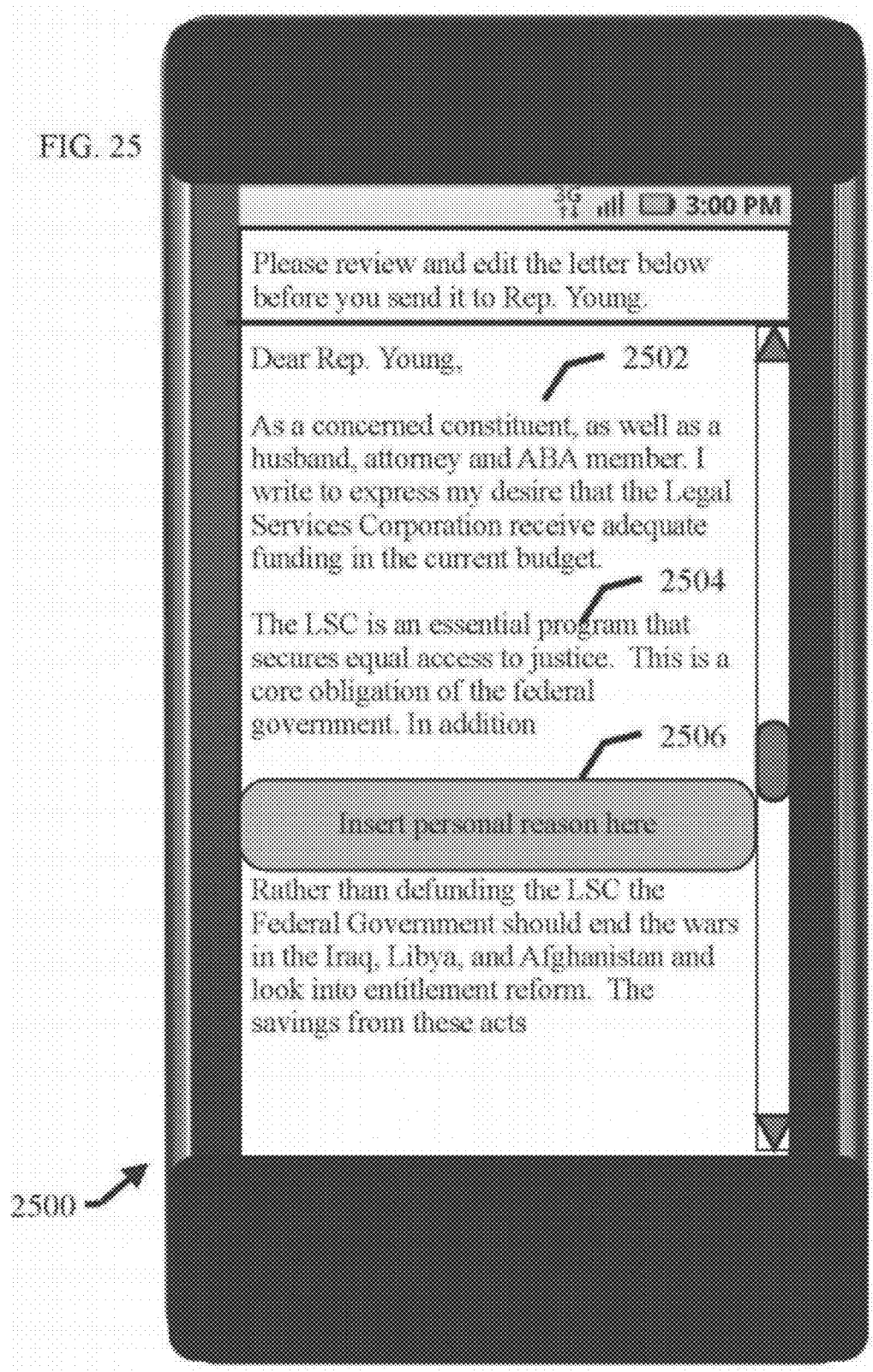
FIG. 25 is an illustration of a particular embodiment of an interface 2500 that the member will use to review the message generated in response to the answers the member provided in response to the questions like those illustrated in FIG. 24.

FIG. 25 is a visual representation of a particular embodiment of the disclosed subject matter operating on a particular mobile device 2500. This particular embodiment displays a methodology for the member, via appropriate input, to review and edit a message generated by the disclosed subject matter's custom message creation capabilities 2502. This representation displays the disclosed subject matter's ability to incorporate the member's answers to the custom creation questions (see FIG. 24) into the framework of the message drafted by the Organization (compare to FIG. 10, 1008) 2504. The representation also shows the disclosed subject matter's ability to allow members to provide a unique answer (see FIG. 24, 2404) by making the appropriate input 2506.

Figure 26:
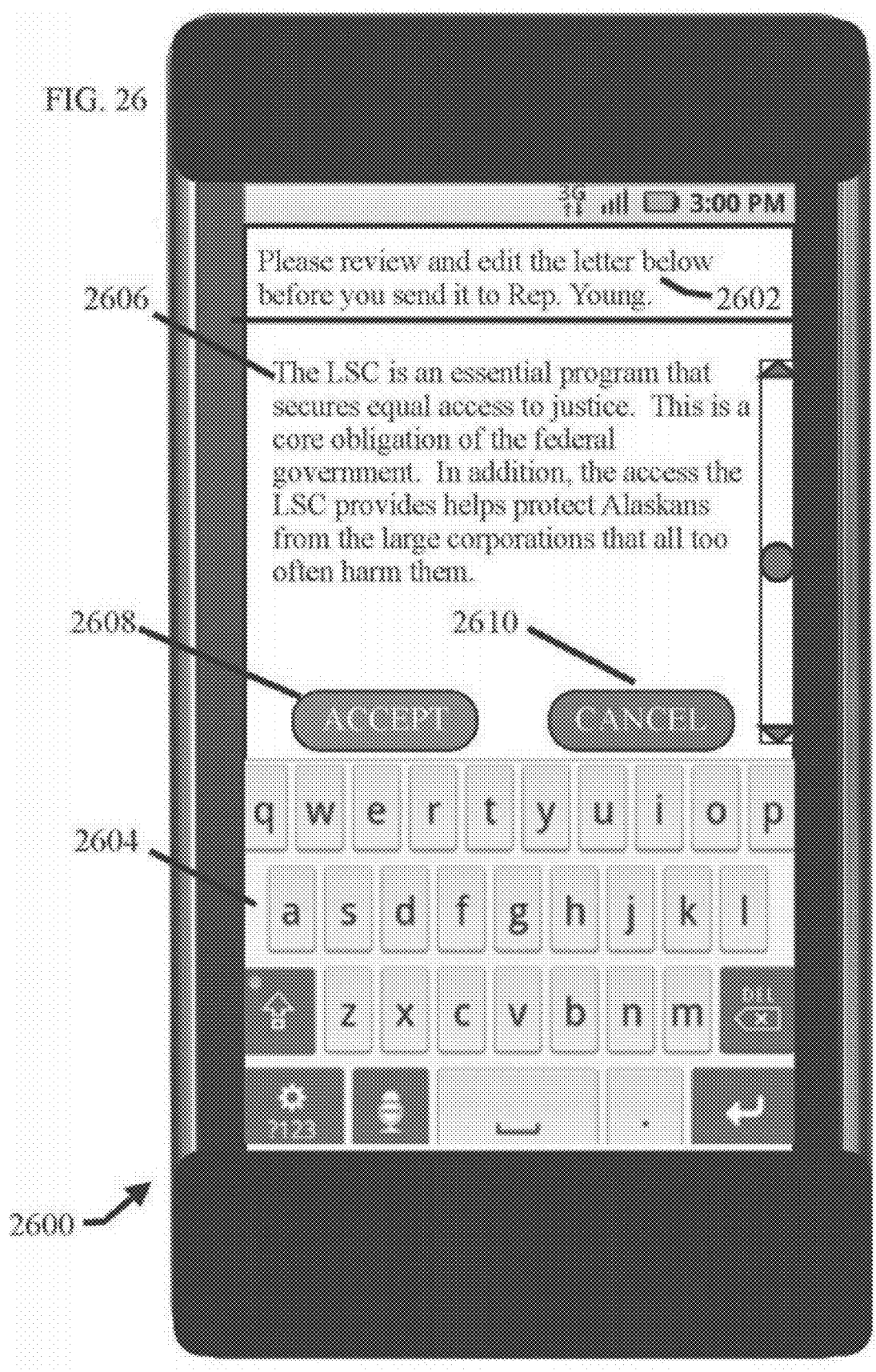
FIG. 26 is an illustration of a particular embodiment of an interface 2600 that the member will use to edit the message created by answering a series of question drafted by the Organization (see FIG. 10).

FIG. 26 is a visual representation of a particular embodiment of the disclosed subject matter operating on a particular mobile device 2600. This particular embodiment displays a methodology for the member, via appropriate input, to review and edit a custom message (see FIG. 10, 1008). This representation displays the Organization's ability to provide the member with guidance for the member's edits 2602. This representation also displays the use of the mobile device's touchscreen keyboard to allow the member to input edits 2604. It should be noted that the member can use other methods to provide input, including but not limited to attached physical keyboards and other devices, wireless keyboards and other devices, styluses, voice commands, or tactile input such as touching, shaking or bumping the device.

This embodiment of the disclosed subject matter also displays its ability to allow the member to visually review edits prior to incorporation into the message 2606. After the member inputs edits the disclosed subject matter allows the member to either accept the edits and incorporated them into the message 2608 or cancel the editing process and return to the prepared message without edits (see FIG. 25) 2610 via appropriate input.

FIG. 27 is a visual representation of a particular embodiment of the disclosed subject matter operating on a particular mobile device 2700. This particular representation displays the disclosed subject matter's ability to incorporate member's edits instantly (see FIG. 26) into the custom message that the member can then review, continue to edit, or send 2702.

FIG. 28 is a visual representation of a particular embodiment of the disclosed subject matter operating on a particular mobile device 2800. This representation displays the disclosed subject matter's ability to provide the member with a custom message (see FIG. 10, 1008) populated with the member's answers to certain questions (see FIG. 24, 2402) and the member's own edits (see FIG. 10, 1008, and FIG. 26) 2802, as well as certain details, including but not limited to the member's name, relevant Official, and location automatically using information provided by the member during the account creation process (see FIG. 2) 2804. If the member approves the message he or she can accept it by providing the appropriate input and take the action desired by the Organization, in this embodiment sending the message to a specific Official 2806. If the member does not want to accept the message he or she can provide the appropriate input and be returned to the part of the disclosed subject matter's process where he or she can elect whether to take a specific action, in this case sending a message, or reject the Organization's request (see FIG. 13) 2808.

FIG. 29 is a visual representation of a particular embodiment of the disclosed subject matter operating on a particular mobile device 2900. This representation displays the disclosed subject matter's ability to have the member record a message, including but not limited to video, photographic, and audio messages, aimed at the Official, using the mobile device's capacity to receive such input, including but not limited to the mobile device's camera, video recorder, and microphone 2906. This representation also displays the disclosed subject matter's ability to convey prompts, including but not limited to talking points and suggestions for effective communication, drafted by the Organization to the member for the member's use before or during the recording of the message 2904, as well as the disclosed subject matter's ability to allow the member to control the recording of the message via appropriate input 2902.

FIG. 30 is a visual representation of a particular embodiment of an electronic venue where messages recorded by members using the disclosed subject matter can be delivered to via the disclosed subject matter for viewing by Officials and/or the public 3000. This particular embodiment has the videos of members in a format where they can be played, shared, and downloaded by visitors to the venue 3202 and 3204. This embodiment is not the exclusive method for communicating such messages with other methods including, but not limited to email, video conferencing, other internet-based venues, and telephony.

FIG. 31 is a visual representation of several potential embodiments of the type of communications generated by the disclosed subject matter and received by Officials 3100. As disclosed previously in this application the disclosed subject matter is capable of allowing Organizations and members create communications including but not limited to text based messages (e.g. email), audio recordings, video recordings, and photographic messages. 3102 is an example of an email generated by the Organization and member interacting with the disclosed subject matter (see FIG. 27) and sent to the Official with the member's input and addressed from the member. The message can be sent by many different methods including but not limited to directly from the member or via third party software and/or server. 3104 is a representation of a video message created by the member, with of prompts provided by the Organization (see FIG. 29), via the disclosed subject matter and sent to the official as an attachment via email. 3106 is a representation of the disclosed subject matter's ability to allow members to record and place messages, including but not limited to video messages (see FIG. 29), on third party venues for viewing by Officials and/or the public and providing automatic notification to officials, along with navigation information, including but not limited to a hyperlink to allow the official to locate and view the message.

Although example diagrams to implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

What is claimed is:

1. A method, the method comprising the following steps:
    receiving a messaging request from an organization on a mobile device, said mobile device having a display, a memory, an input medium, and a communication medium, wherein said messaging request is received via said communication medium and wherein said messaging request includes at least said organization, an official, said organization's message, and at least one prompt, said at least one prompt related to said organization's message;
    displaying said organization's message on said display;
    presenting on said display a first option, said first option including at least ignore and customize;
    receiving a user's selection of said first option via said input medium, wherein based on said user's selection of said first option:
        if said user selects customize:
            displaying said at least one prompt to said user on said display;
            storing said user's response to said at least one prompt in said memory;
            creating a user customized message based on said user's responses to said at least one prompt, said user customized message created on said mobile device;
            displaying said user customized message on said display along with a second option, said second option to accept or reject said user customized message and either:
                transmitting said user customized message to said official via said communication medium if said user selects accept; or
                providing said user the opportunity to provide feedback to said organization, said feedback related to why said user rejected said user customized message; and
                transmitting a rejection notification to said organization, said rejection notification including said feedback, if any;
        if said user selects ignore:
            providing said user the opportunity to provide feedback to said organization, said feedback related to why said user ignored said organization's message;
            transmitting an ignore notification to said organization, said ignore notification including said feedback, if any; and
            logging statistical information regarding said user's actions associated with said messaging request.

2. The method of claim 1, with the additional step of providing said user the opportunity to share said organization's message or said user customized message with others via said communication medium.

3. The method of claim 1, wherein said transmitting of said organization's message or said user customized message to said official is:
    transmitted to a third party server;
    repackaged to appear to said official as if being transmitted from said user's said mobile device; and
    transmitted to said official.

4. The method of claim 3, wherein said user customized message includes at least one video and/or audio recording of said user;
    said video and/or audio recording stored on said third party server prior to said repackaging step; and
    said repackaging step includes removing said video and/or audio recording and adding a link to where said video and/or audio recording is stored on said third party server prior to transmitting to said official such that said official can access said video and/or audio recording by following said link.

5. The method of claim 1, wherein said transmitting of said organization's message or said user customized message to said official is accomplished by said mobile device without requiring a third party server.

6. The method of claim 1, wherein said mobile device is a smart phone or tablet device.

7. The method of claim 1, wherein said user customized message includes at least one video recording of said user.

8. The method of claim 1, wherein said user customized message includes at least one audio recording of said user.

9. The method of claim 1, wherein said messaging request is prepopulated with said user's information, said user's information including at least said user's name, said user's email address, and said official's name.

10. The method of claim 1, with the additional step of automatically populating said organization's message with at least said user's information including at least said user's name, said user's email address, and said official's name after said messaging request is received by said mobile device.

11. The method of claim 1, wherein said prompt includes a customization question or a talking point.

12. A non-transitory computer readable medium encoded with a program, said program capable of performing at least the following steps when executed on a computer:
    receiving a messaging request from an organization on a mobile device, said mobile device having a display, a memory, an input medium, and a communication medium, wherein said messaging request is received via said communication medium and wherein said messaging request includes at least said organization, an official, said organization's message, and at least one prompt, said at least one prompt related to said organization's message;
    displaying said organization's message on said display;
    presenting on said display a first option, said first option including at least ignore and customize;
    receiving a user's selection of said first option via said input medium, wherein based on said user's selection of said first option:
        if said user selects customize:
            displaying said at least one prompt to said user on said display;

storing said user's response to said at least one prompt in said memory;

creating a user customized message based on said user's responses to said at least one prompt, said user customized message created on said mobile device;

displaying said user customized message on said display along with a second option, said second option to accept or reject said user customized message and either:

transmitting said user customized message to said official via said communication medium if said user selects accept; or providing said user the opportunity to provide feedback to said organization, said feedback related to why said user rejected said user customized message; and transmitting a rejection notification to said organization, said rejection notification including said feedback, if any;

if said user selects ignore:

providing said user the opportunity to provide feedback to said organization, said feedback related to why said user ignored said organization's message;

transmitting an ignore notification to said organization, said ignore notification including said feedback, if any; and logging statistical information regarding said user's actions associated with said messaging request.

13. The non-transitory computer readable medium of claim 12, with the additional step of providing said user the opportunity to share said organization's message or said user customized message with others via said communication medium.

14. The non-transitory computer readable medium of claim 12, wherein said transmitting of said organization's message or said user customized message to said official is:

transmitted to a third party server;

repackaged to appear to said official as if being transmitted from said user's said mobile device; and transmitted to said official.

15. The non-transitory computer readable medium of claim 14, wherein said user customized message includes at least one video and/or audio recording of said user;

said video and/or audio recording stored on said third party server prior to said repackaging step; and said repackaging step includes removing said video and/or audio recording and adding a link to where said video and/or audio recording is stored on said third party server prior to transmitting to said official such that said official can access said video and/or audio recording by following said link.

16. The non-transitory computer readable medium of claim 12, wherein said user customized message includes at least one video recording of said user.

17. The non-transitory computer readable medium of claim 12, wherein said transmitting of said organization's message or said user customized message to said official is accomplished by said mobile device without requiring a third party server.

18. The non-transitory computer readable medium of claim 12, wherein said messaging request is prepopulated with said user's information, said user's information including at least said user's name, said user's email address, and said official's name.

19. The non-transitory computer readable medium of claim 12, with the additional step of automatically populating said organization's message with at least said user's information including at least said user's name, said user's email address, and said official's name after said messaging request is received by said mobile device.

20. The non-transitory computer readable medium of claim 12, wherein said prompt includes a customization question or a talking point.

* * * * *